(12) United States Patent
Kikuchi et al.

(10) Patent No.: US 6,424,705 B1
(45) Date of Patent: *Jul. 23, 2002

(54) SPEECH FEE DISPLAY METHOD

(75) Inventors: Toru Kikuchi; Futoshi Hachimura, both of Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/709,735

(22) Filed: Nov. 13, 2000

Related U.S. Application Data

(63) Continuation of application No. 09/012,153, filed on Aug. 11, 2000, which is a continuation of application No. 08/428,045, filed on Apr. 25, 1995, now abandoned.

(30) Foreign Application Priority Data

Apr. 28, 1994 (JP) ............................................. 6-114039
Jul. 15, 1994 (JP) ............................................. 6-186541
Apr. 12, 1995 (JP) ............................................. 7-111211

(51) Int. Cl.⁷ ........................................... H04M 15/00
(52) U.S. Cl. .............................. 379/114.01; 379/114.03
(58) Field of Search ................................ 379/111, 112, 379/113, 114, 115, 121, 130, 133, 134, 144, 202, 204, 205, 114.01, 114.02, 114.03; 455/405, 406, 407, 408

(56) References Cited

U.S. PATENT DOCUMENTS

| | | | | |
|---|---|---|---|---|
| 4,726,056 A | 2/1988 | An et al. | ...................... | 379/114 |
| 4,776,000 A | 10/1988 | Parienti | ...................... | 379/144 |
| 4,847,775 A | 7/1989 | Ito | .............................. | 364/200 |
| 4,879,742 A | 11/1989 | Taniguchi et al. | .......... | 379/130 |
| 5,003,584 A | 3/1991 | Benyacae et al. | ............ | 379/119 |
| 5,027,387 A | 6/1991 | Moll | ............................ | 389/115 |
| 5,146,491 A | 9/1992 | Silver et al. | ................ | 379/114 |
| 5,239,386 A | 8/1993 | Ishiwatari et al. | ........... | 358/440 |
| 5,303,297 A * | 4/1994 | Hillis | .......................... | 379/114 |
| 5,309,251 A | 5/1994 | Terajima | ...................... | 358/400 |
| 5,311,580 A | 5/1994 | Otsuka et al. | ............... | 379/114 |
| 5,381,467 A * | 1/1995 | Rosinski et al. | ............. | 379/113 |
| 5,430,794 A | 7/1995 | Ayame | ........................ | 379/114 |
| 5,436,961 A | 7/1995 | Kobayashi | ................... | 379/114 |
| 5,438,615 A | 8/1995 | Moen | .......................... | 379/112 |
| 5,488,655 A | 1/1996 | Hamlen | ...................... | 379/114 |
| 5,646,984 A | 7/1997 | Oda | ............................ | 379/114 |
| 5,699,416 A | 12/1997 | Atkins | ........................ | 379/115 |
| 5,822,411 A * | 10/1998 | Swale et al. | ................. | 379/111 |

FOREIGN PATENT DOCUMENTS

| | | |
|---|---|---|
| GB | 01669 | 7/1994 |
| JP | A 60-236350 | 11/1985 |
| JP | A 61-187151 | 11/1986 |
| JP | A 62-42660 | 2/1987 |
| JP | JAP 63-97054 | 4/1988 |
| JP | A 63-97055 | 4/1988 |
| JP | A 2-105669 | 4/1990 |
| JP | A 2-180462 | 7/2000 |

* cited by examiner

Primary Examiner—Vijay Shankar
(74) Attorney, Agent, or Firm—Morgan & Finnegan, LLP

(57) ABSTRACT

A control method of a second terminal which communicates with a partner of a communication by a first terminal. Fee information to calculate a fee per unit time of the communication by the first terminal is obtained. The fee information obtained is transmitted via a radio line to the second terminal which communicates with the partner of the communication by the first terminal. The fee information transmitted is received and the speech fee is calculated and displayed. The communication by the first terminal is held is subsequently restarted by a request from the second terminal.

16 Claims, 46 Drawing Sheets

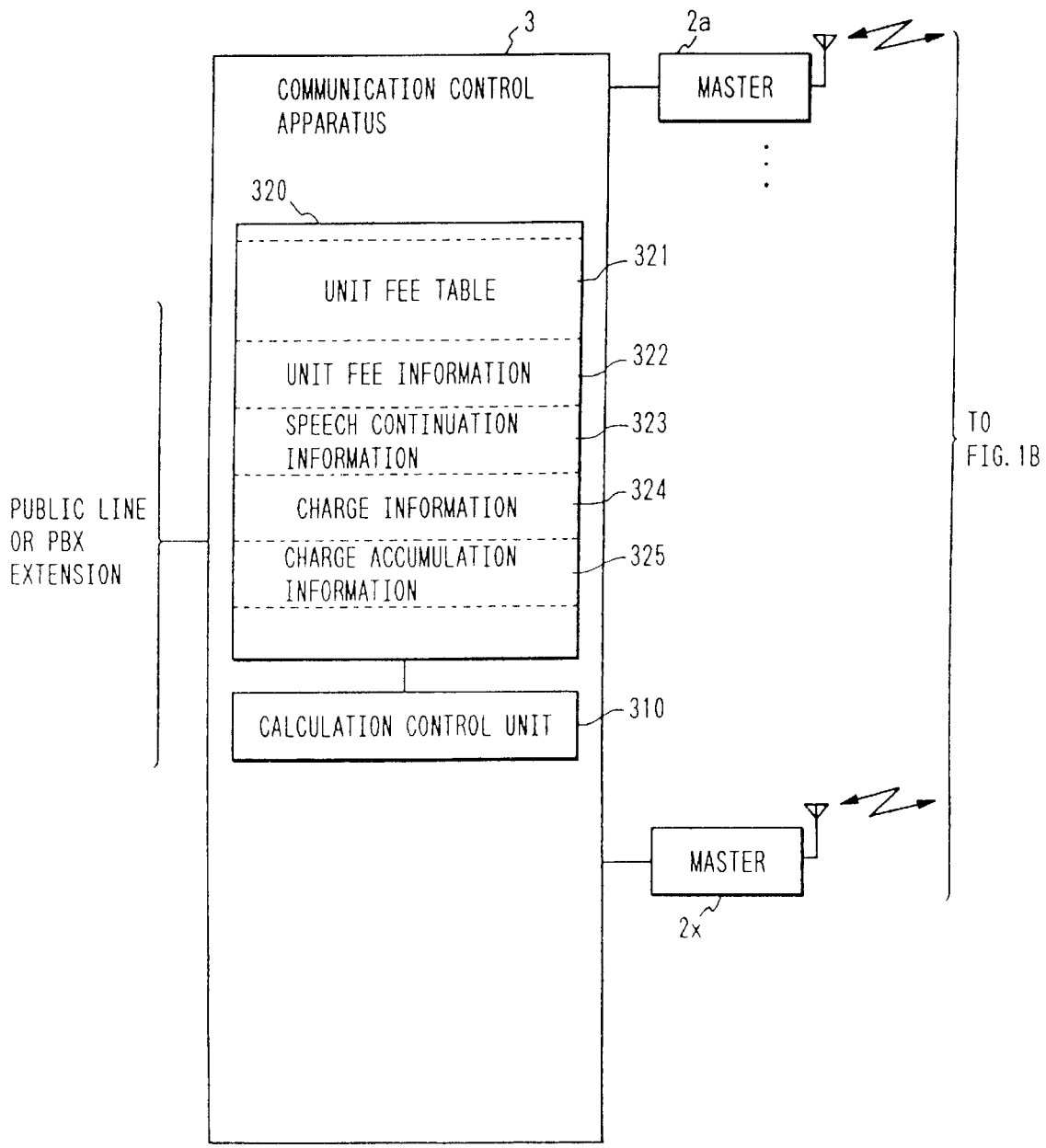

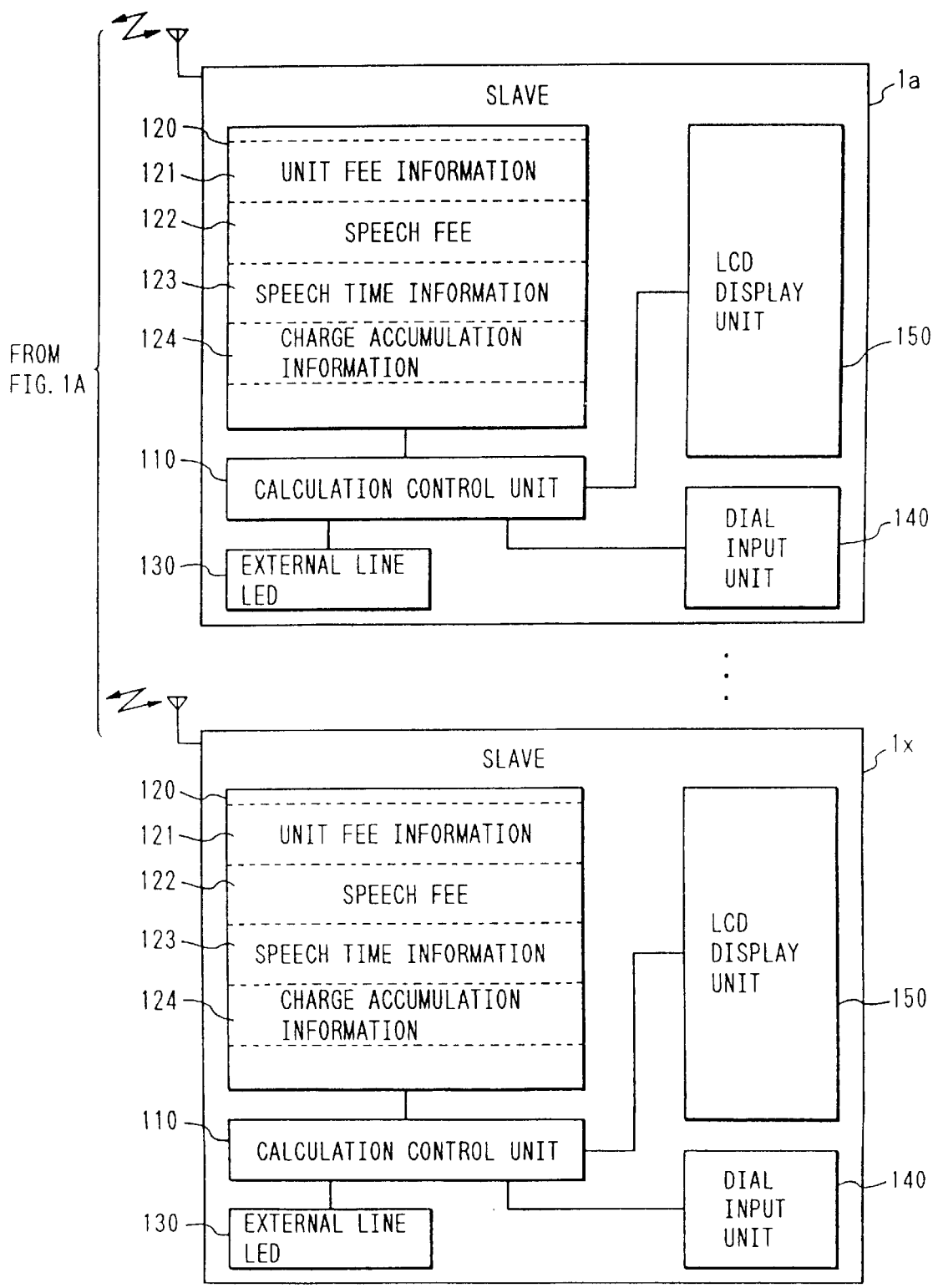

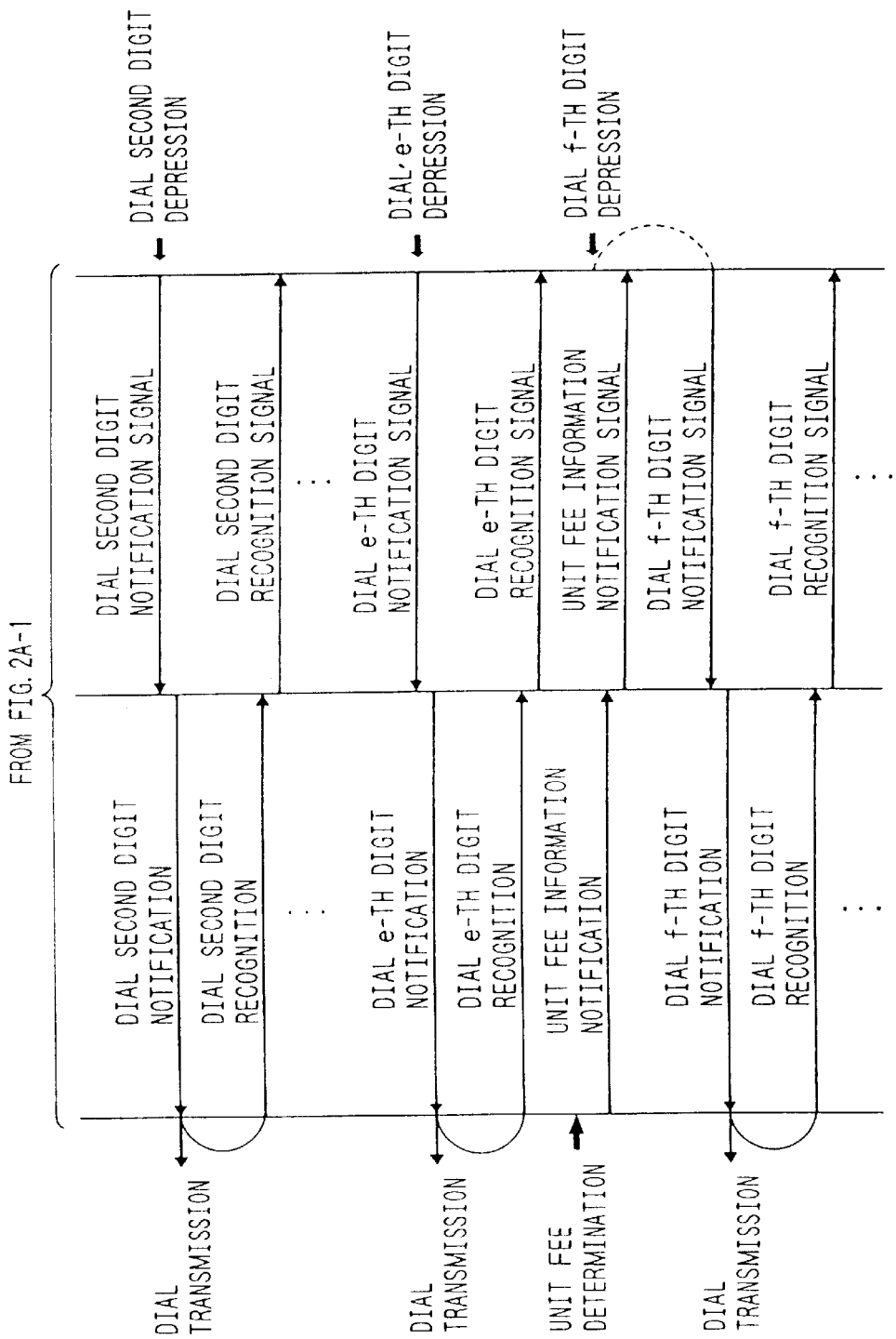

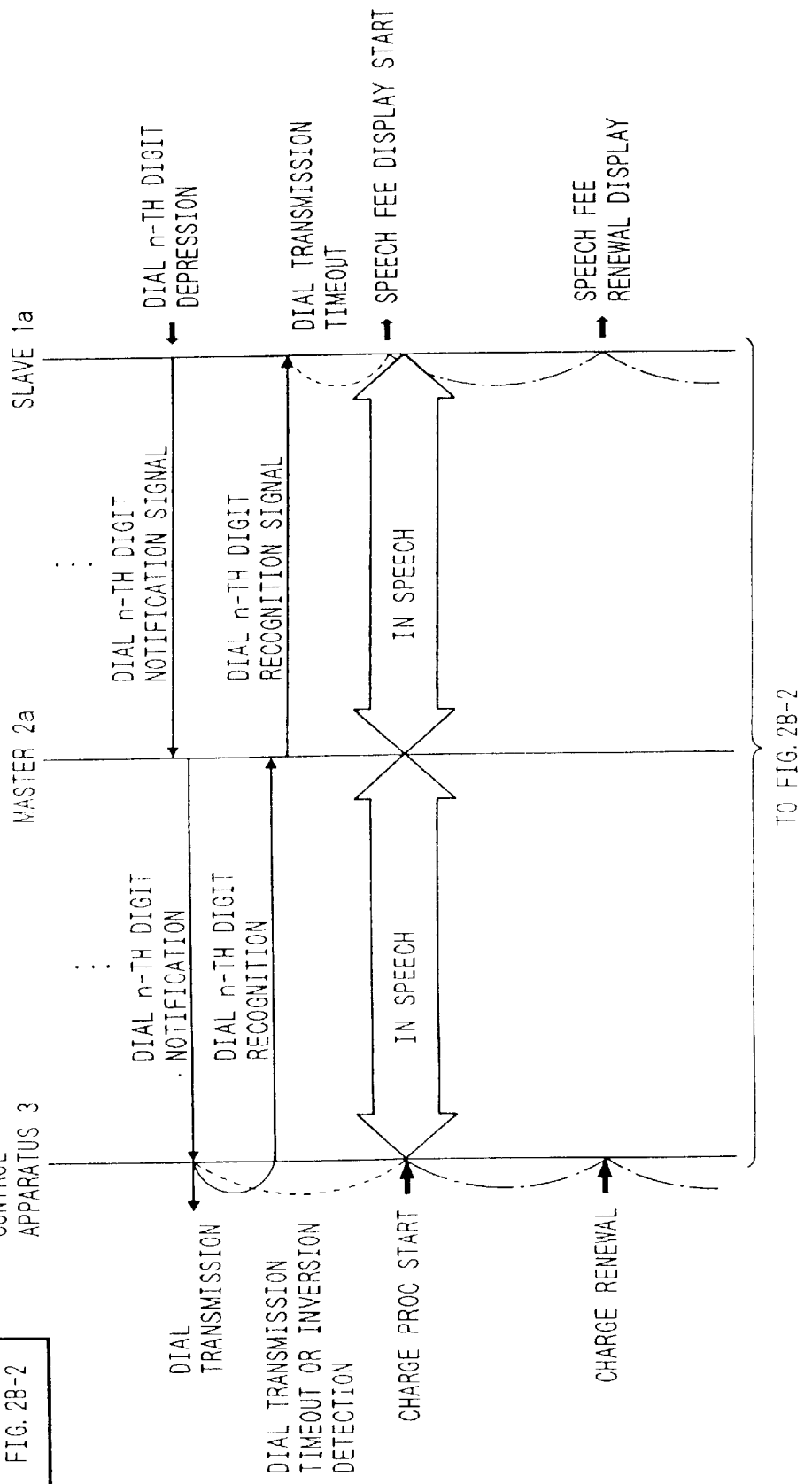

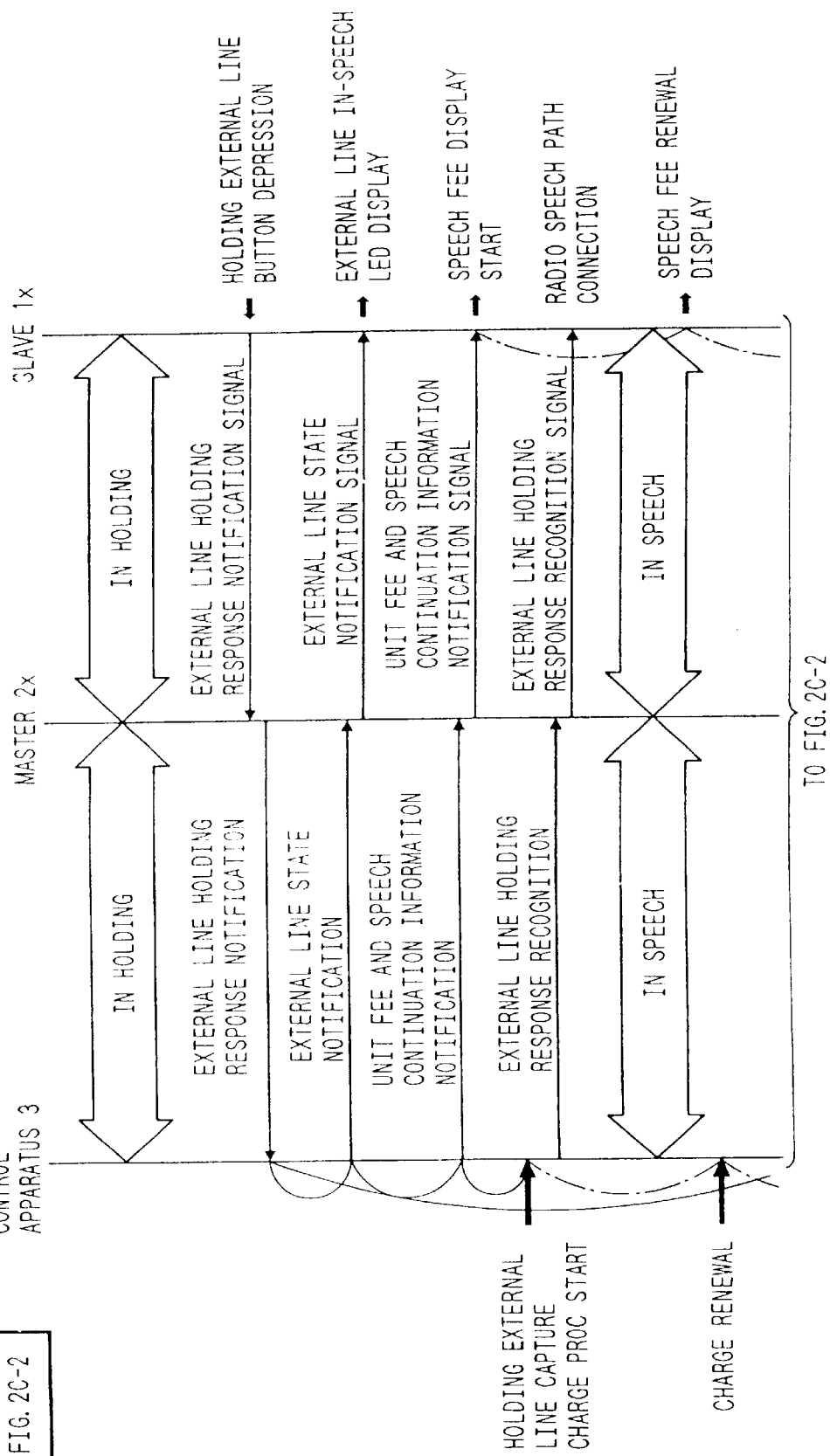

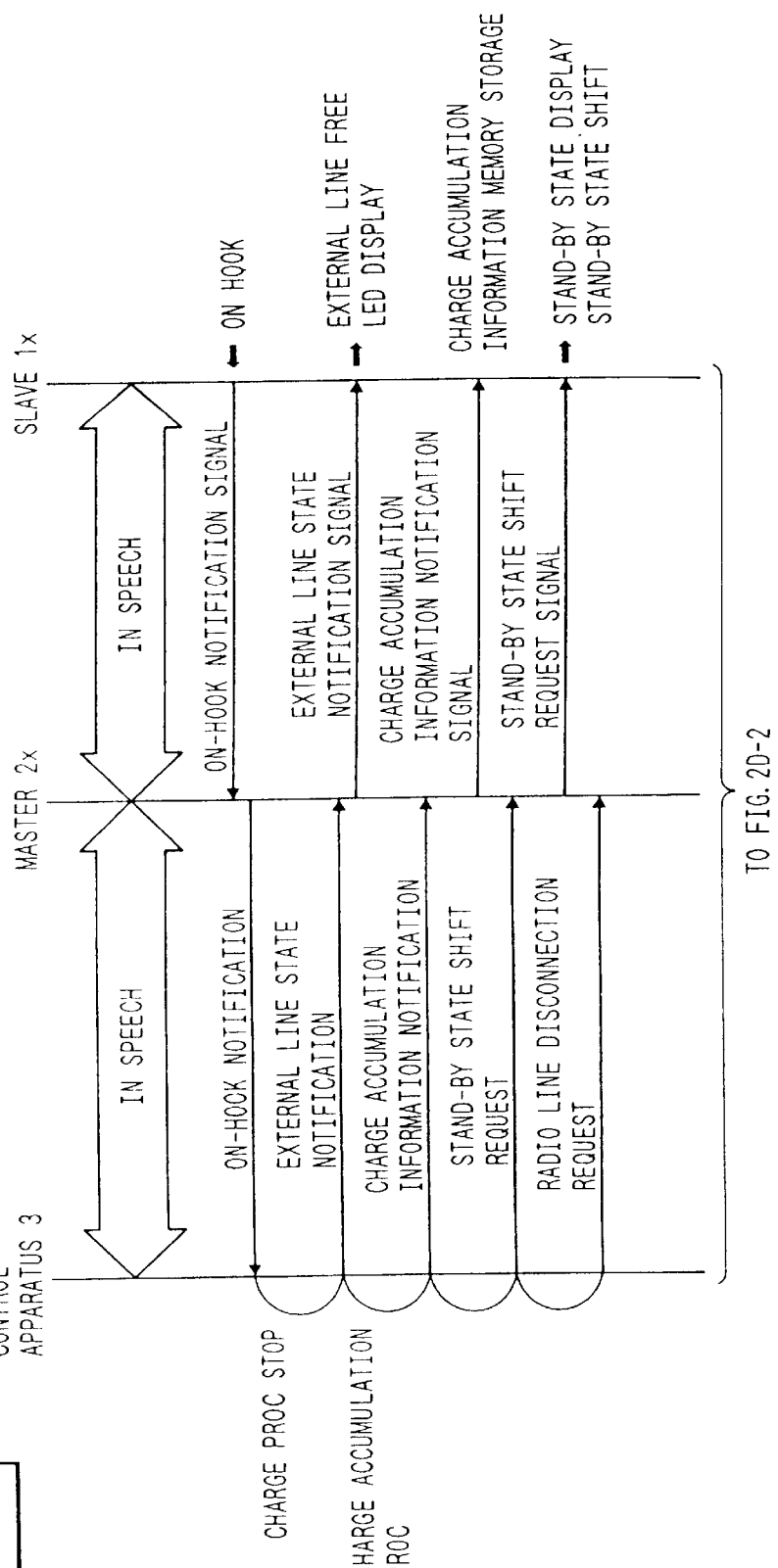

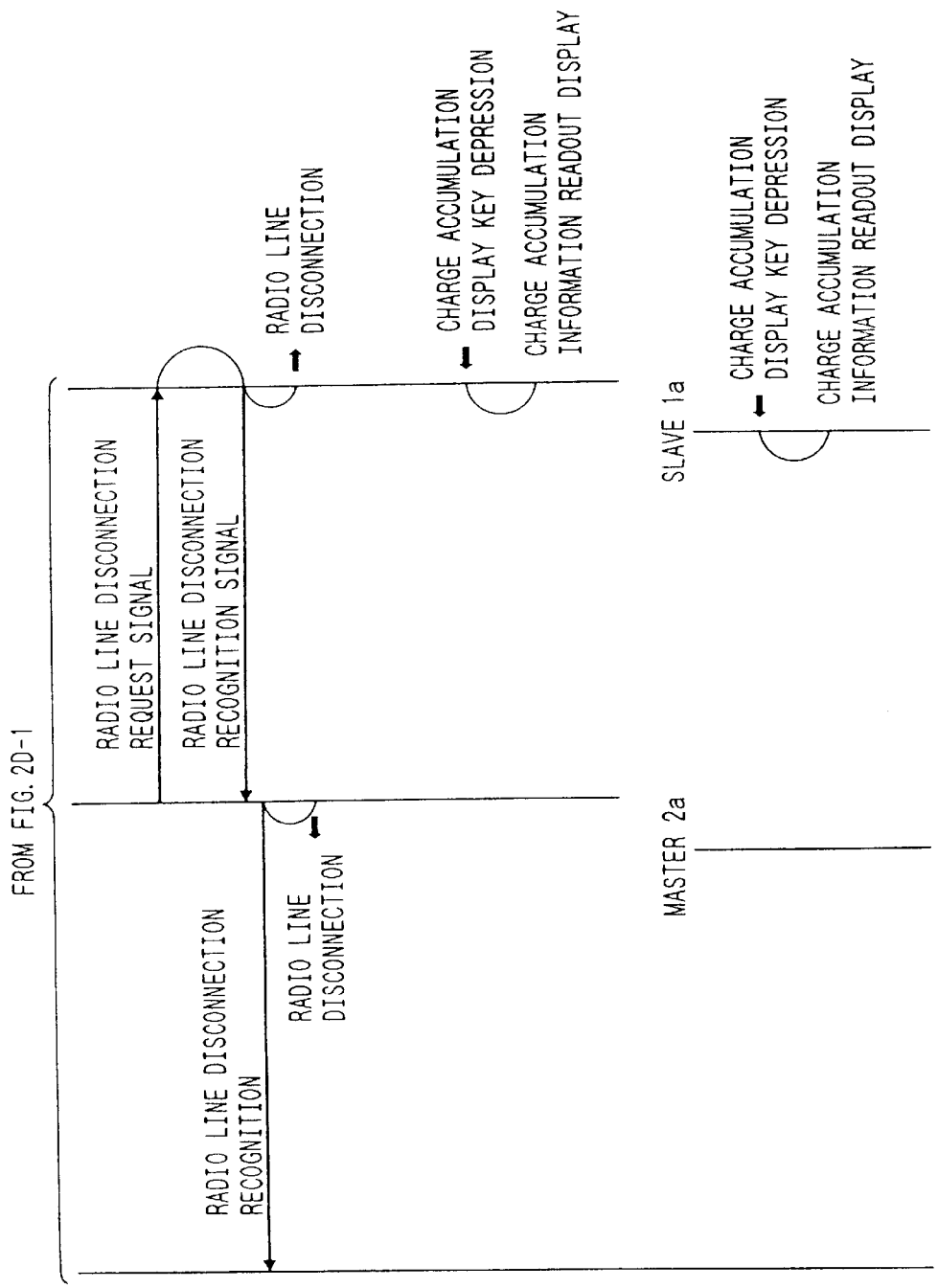

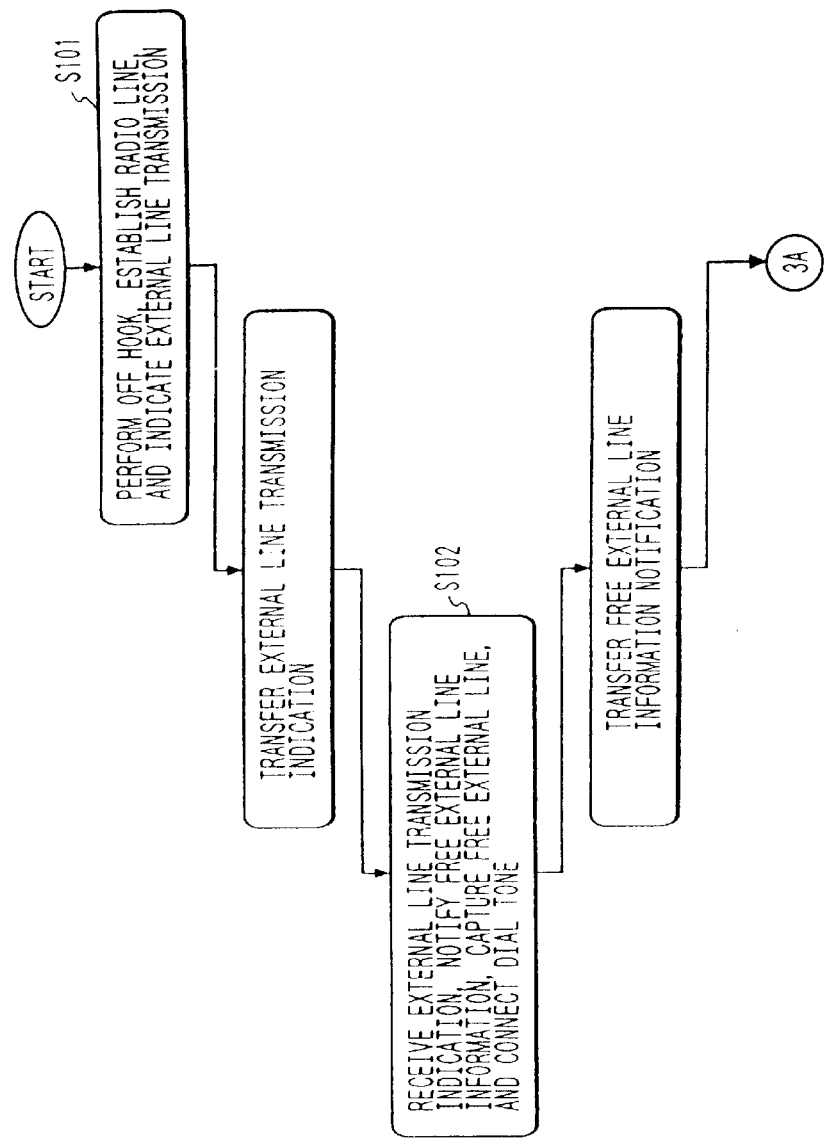

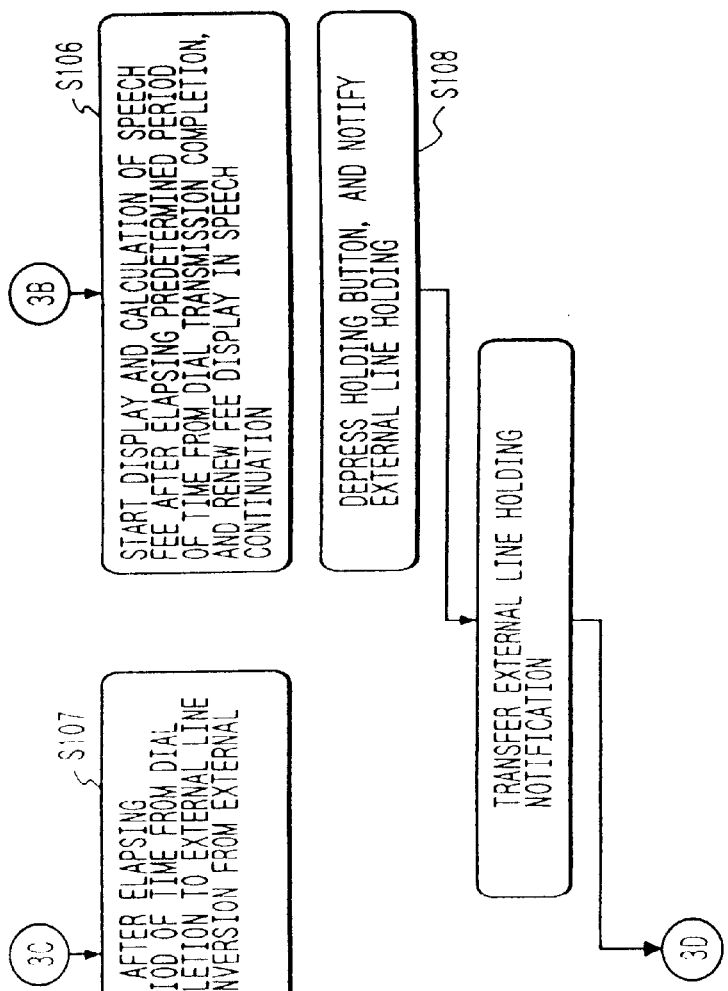

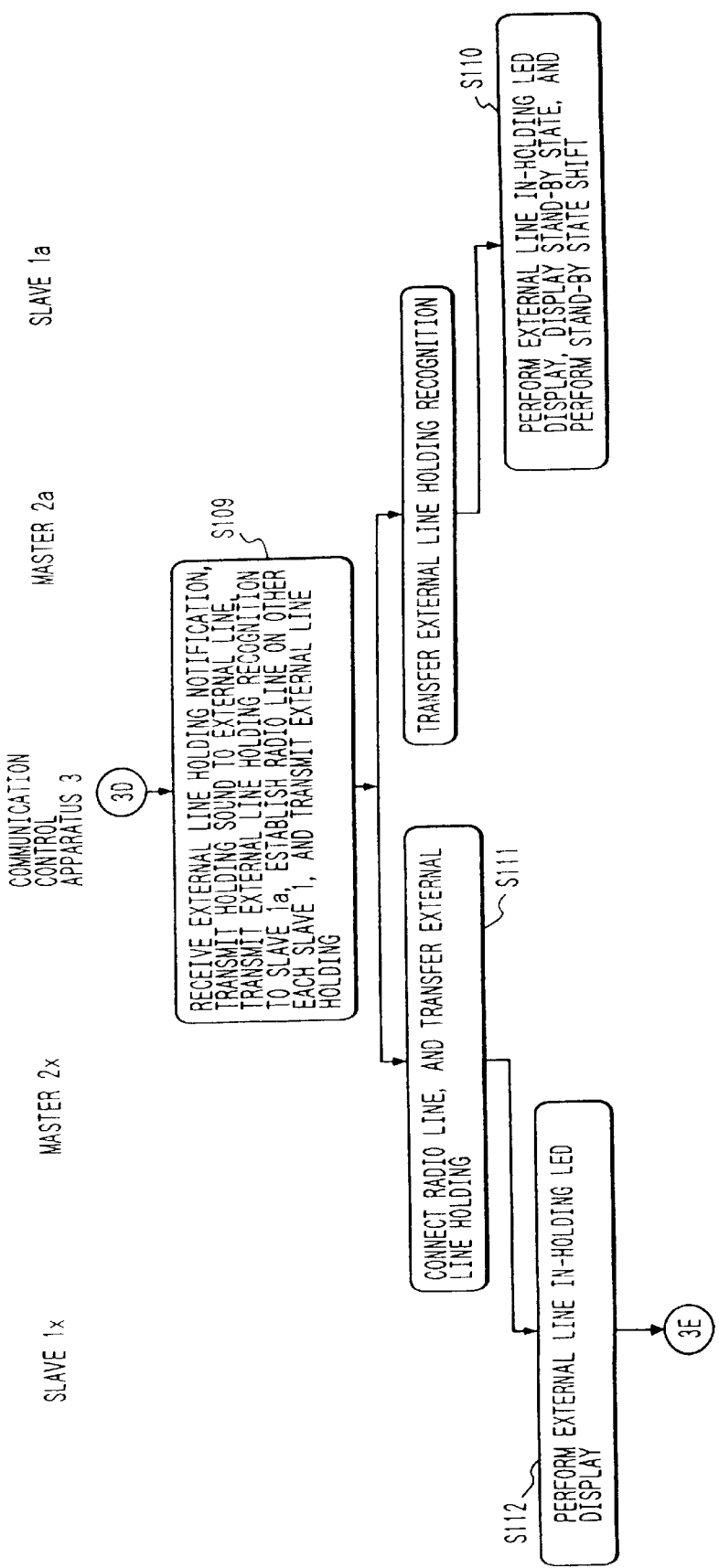

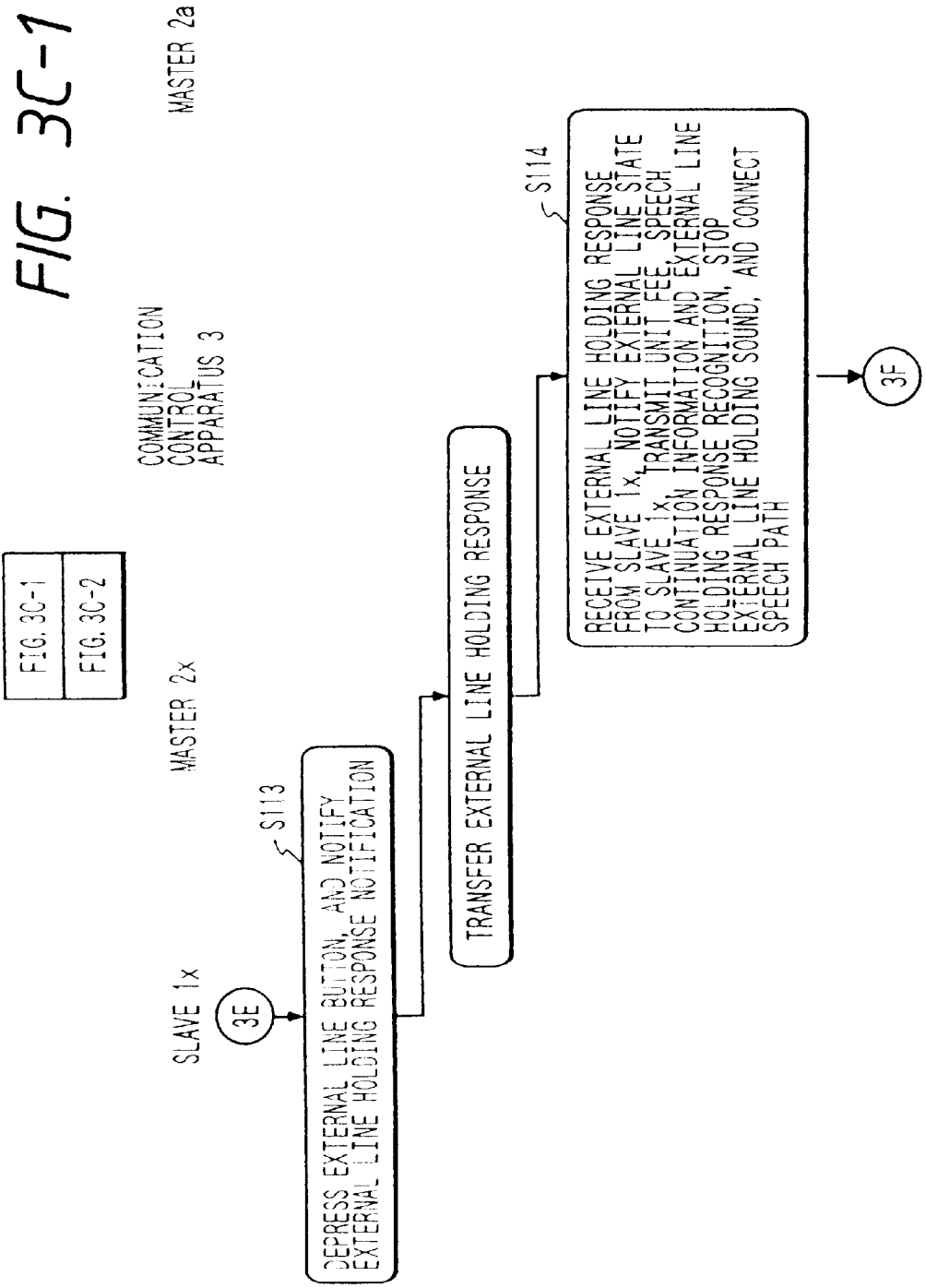

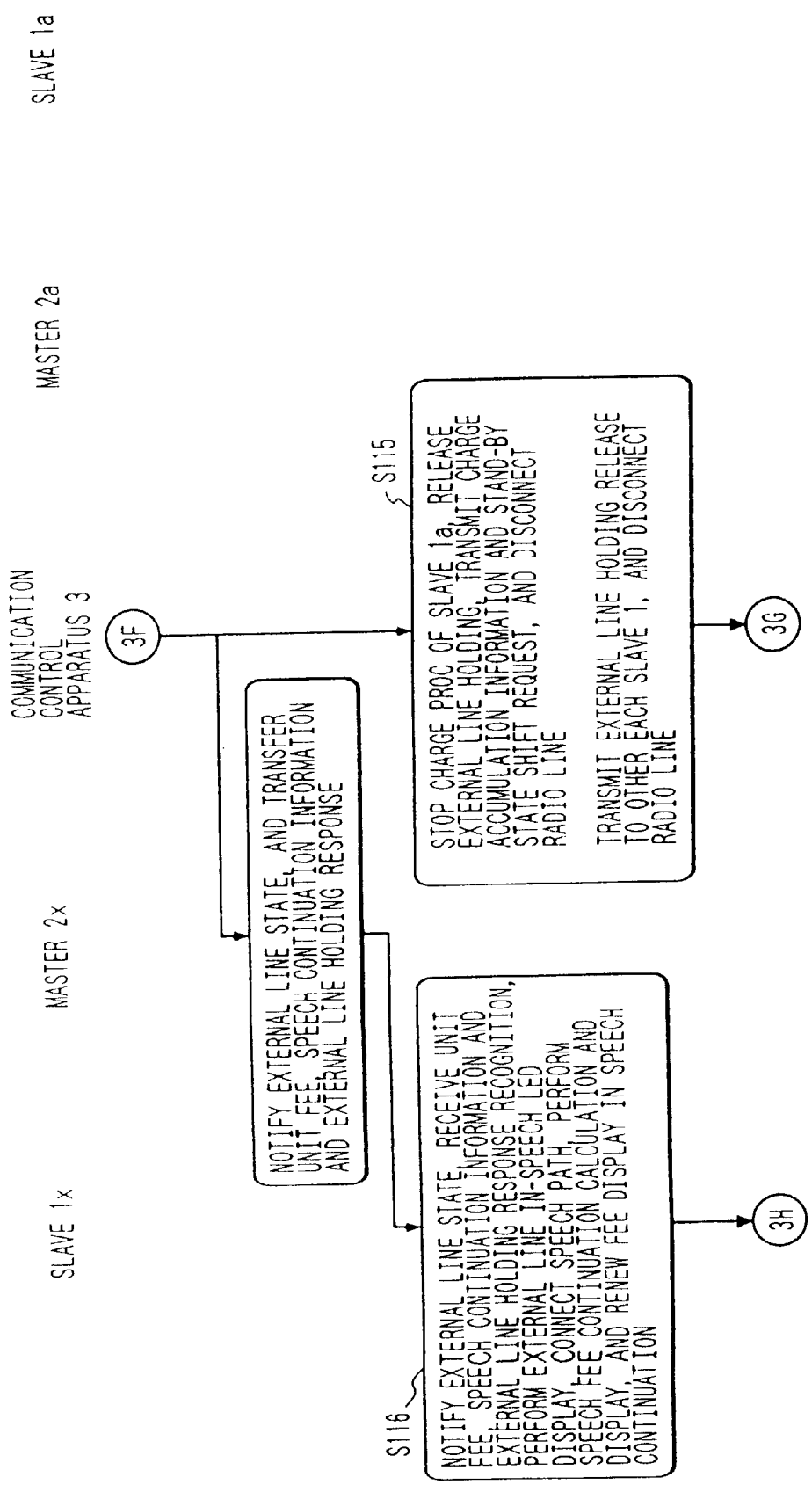

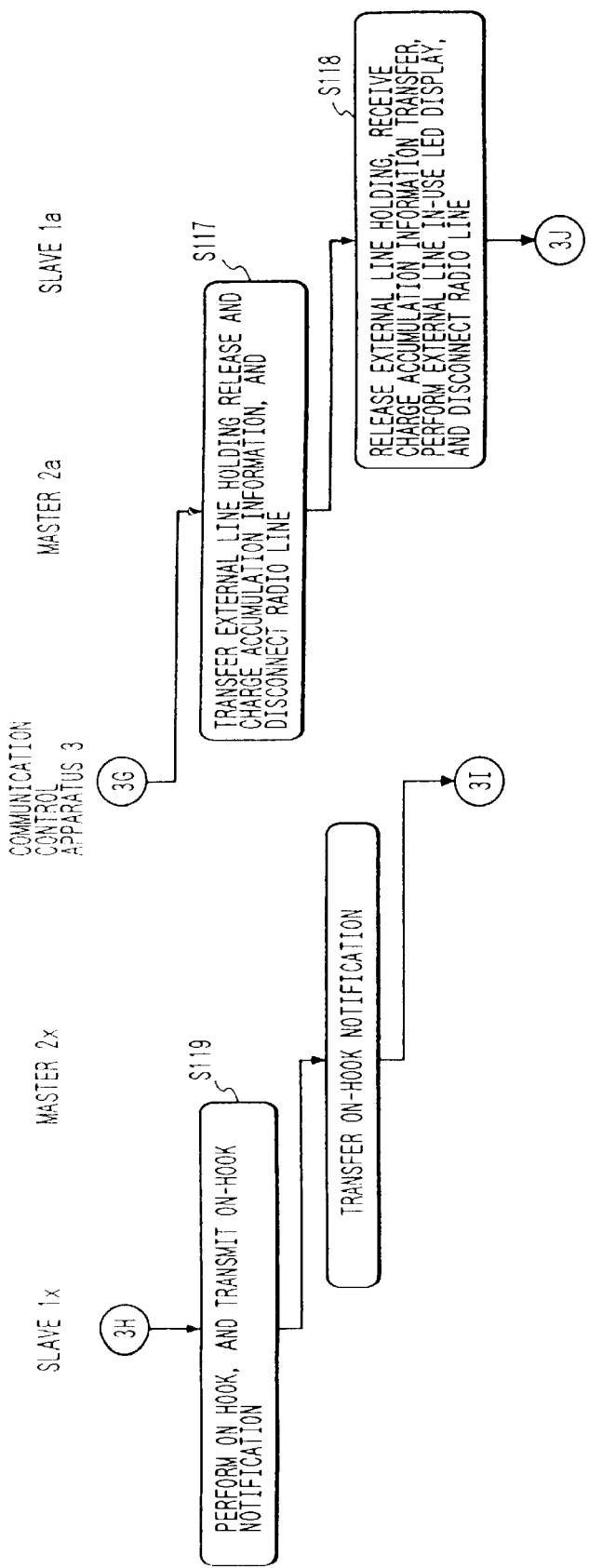

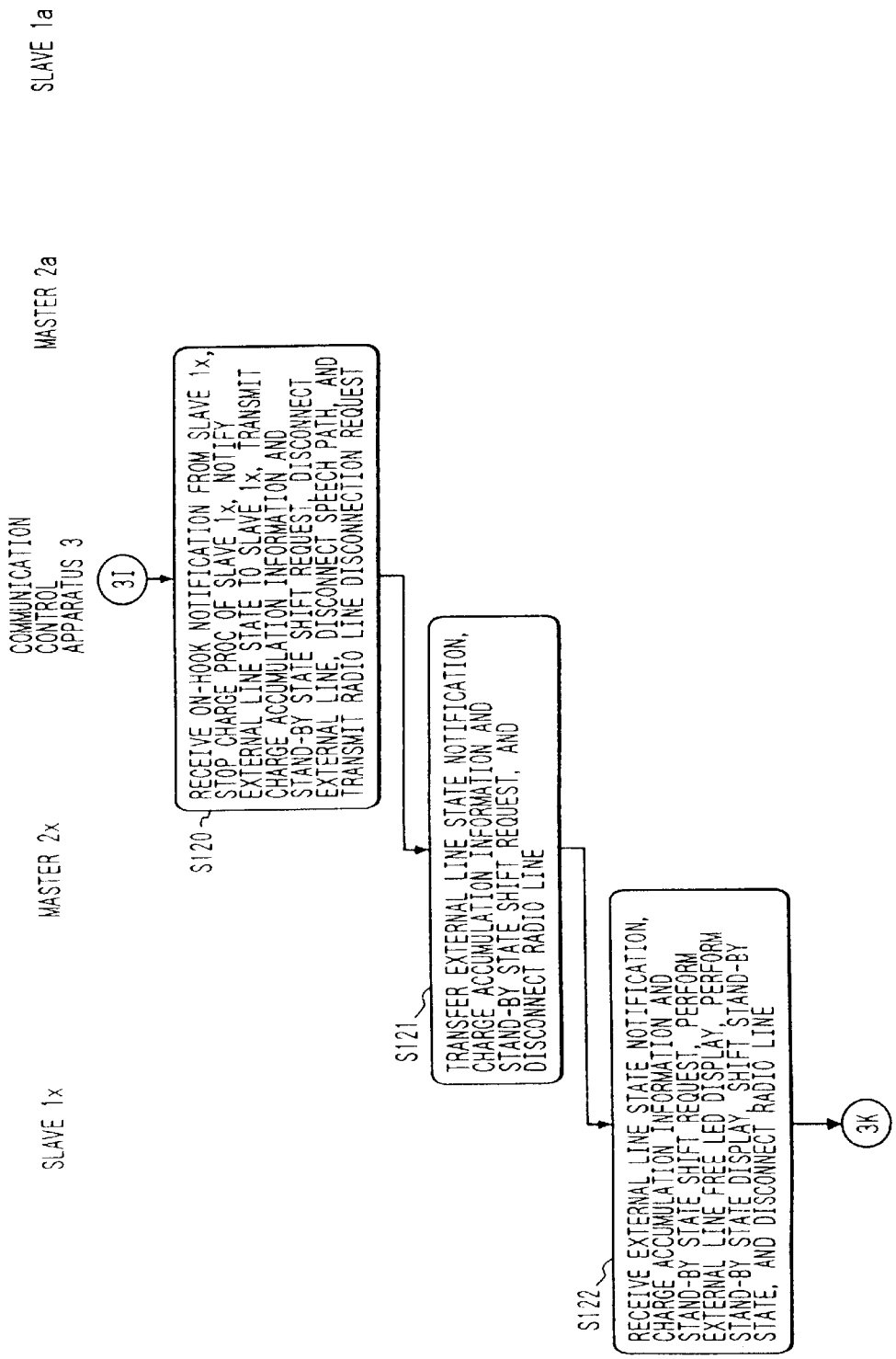

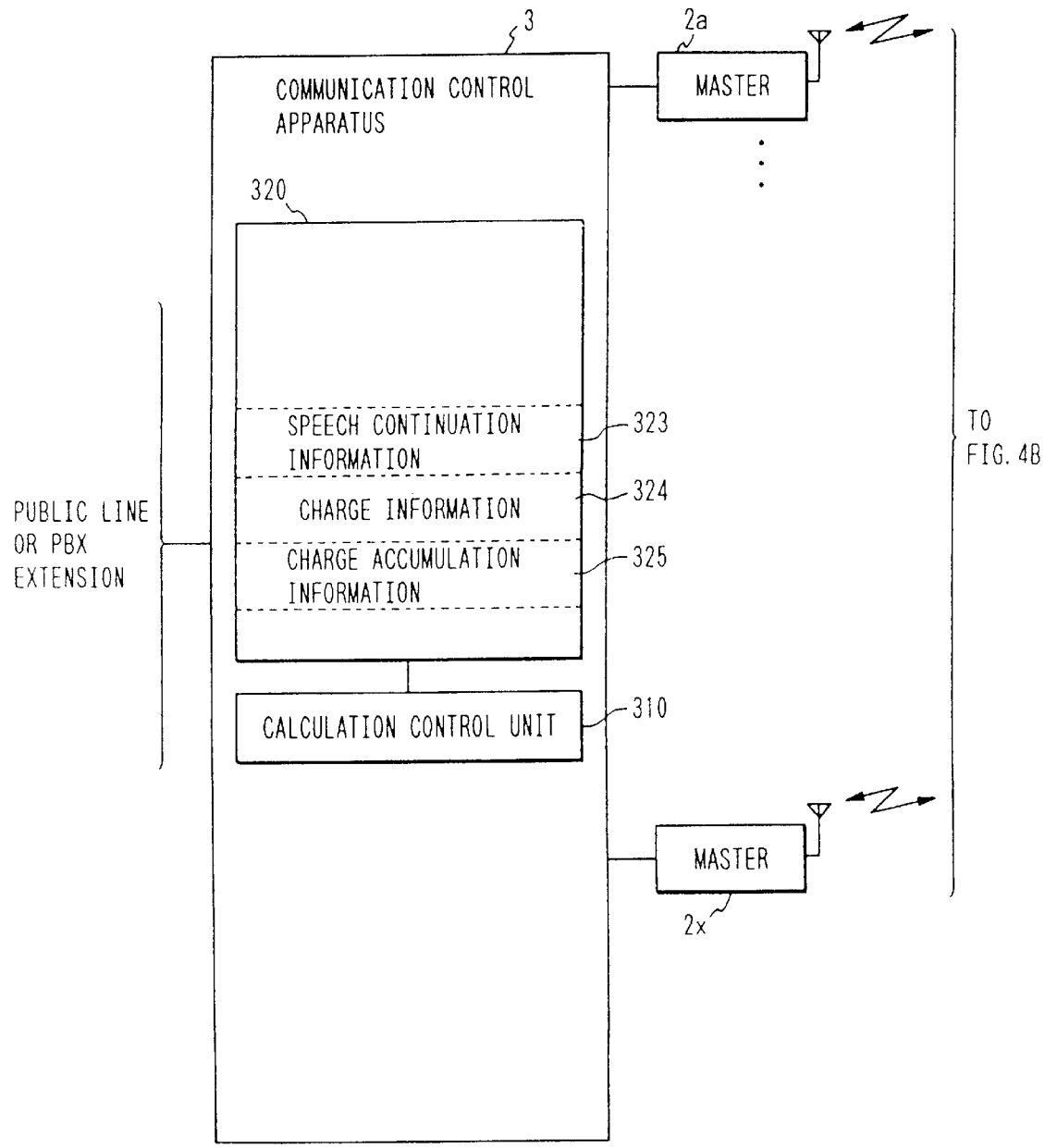

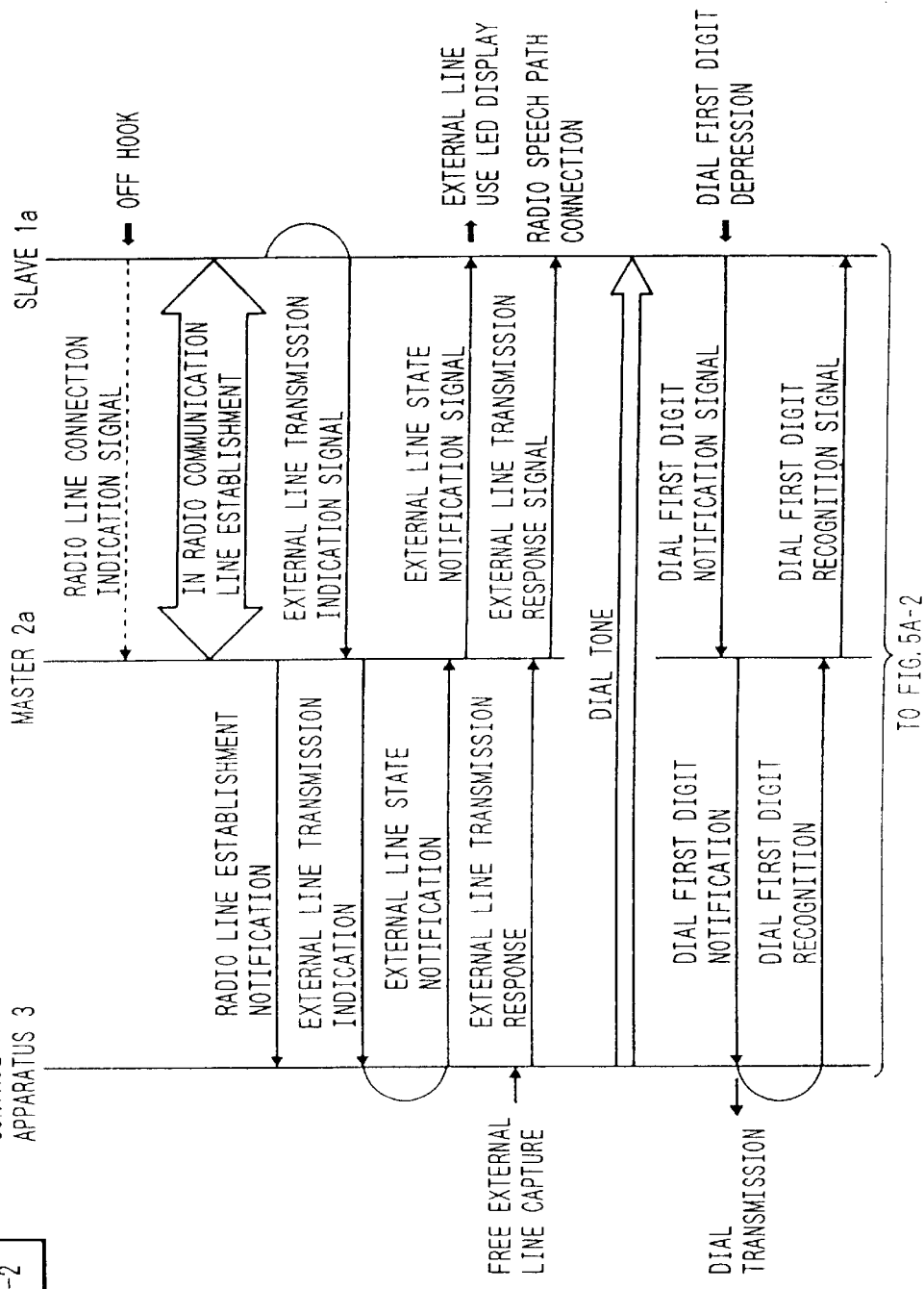

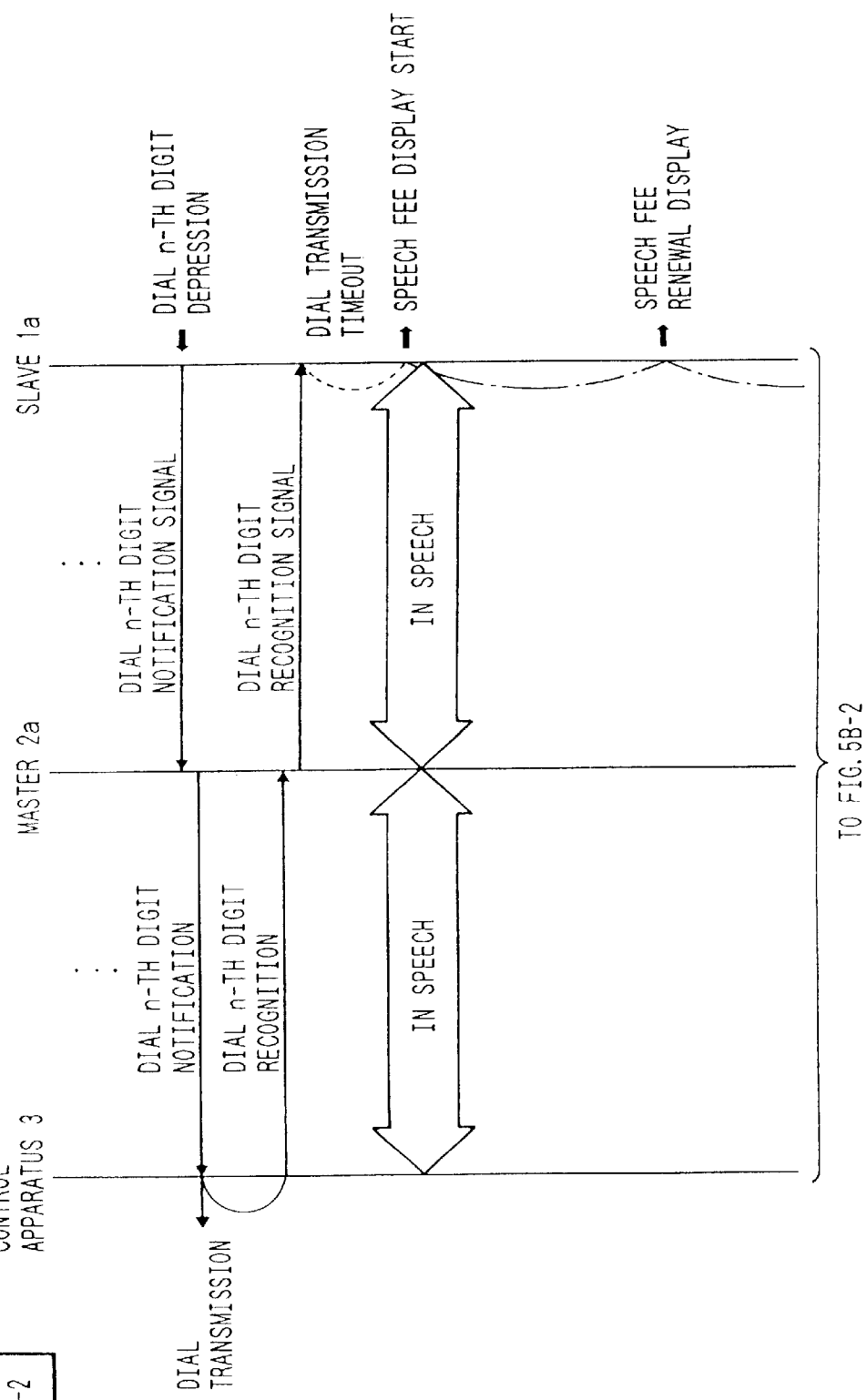

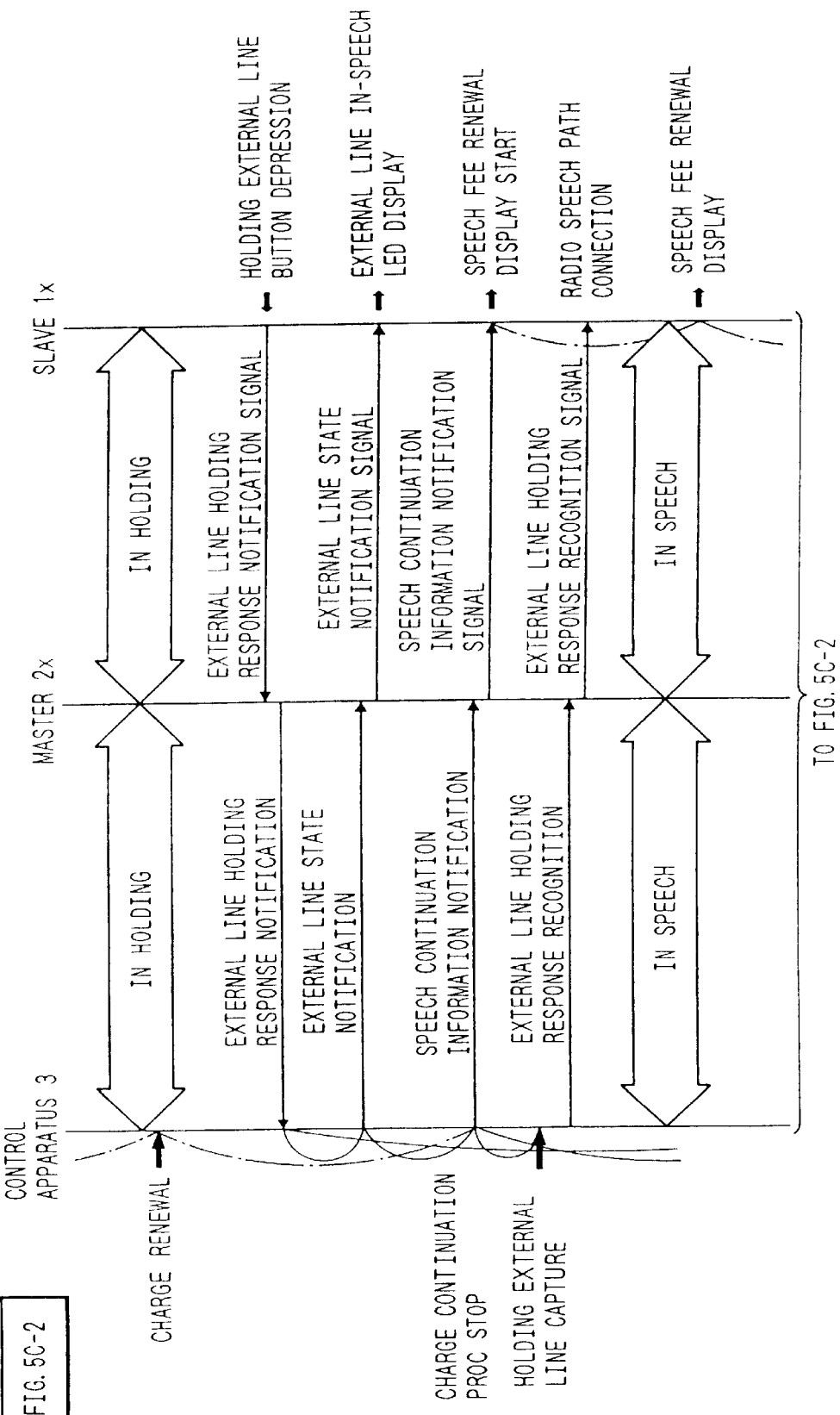

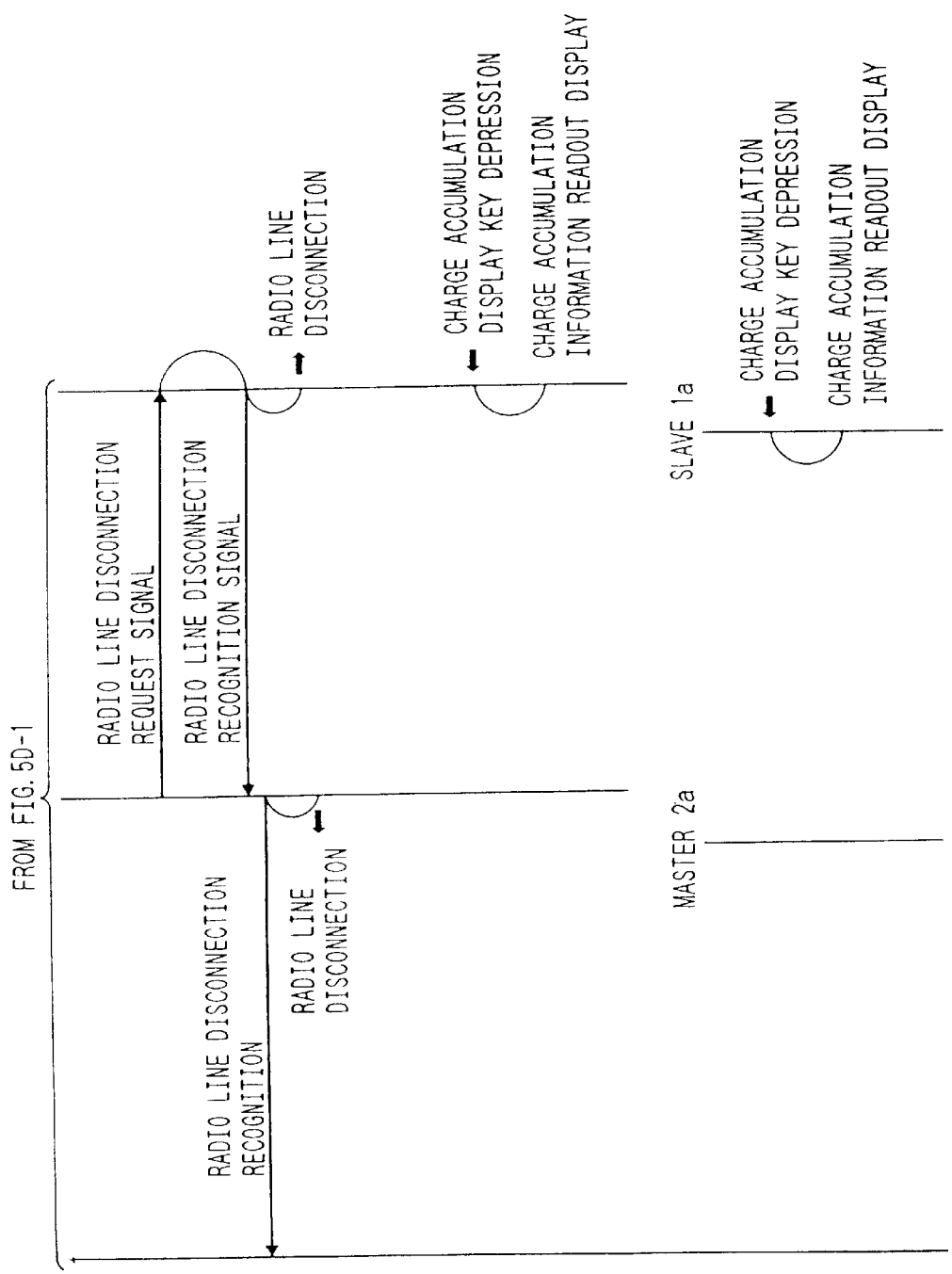

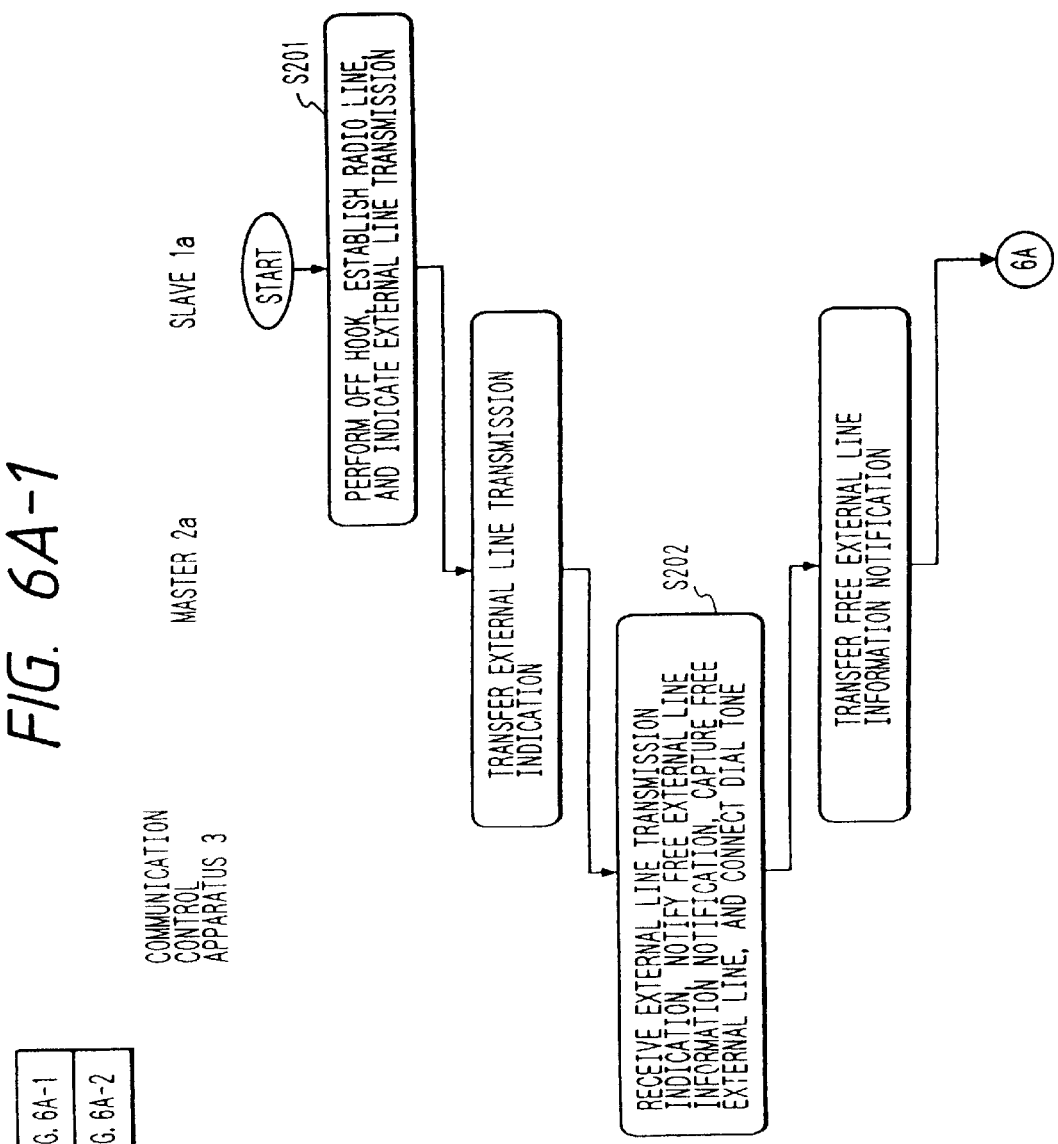

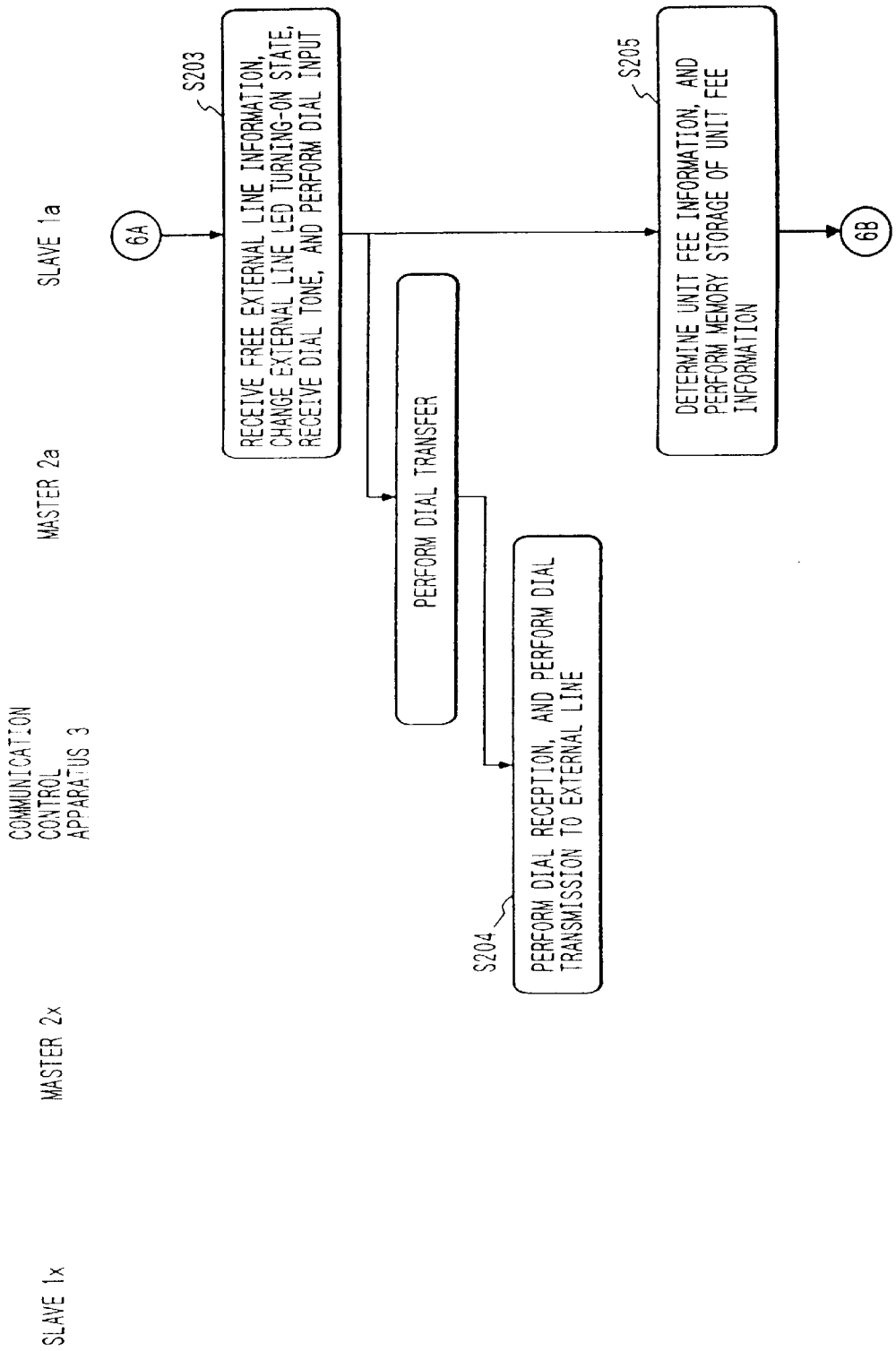

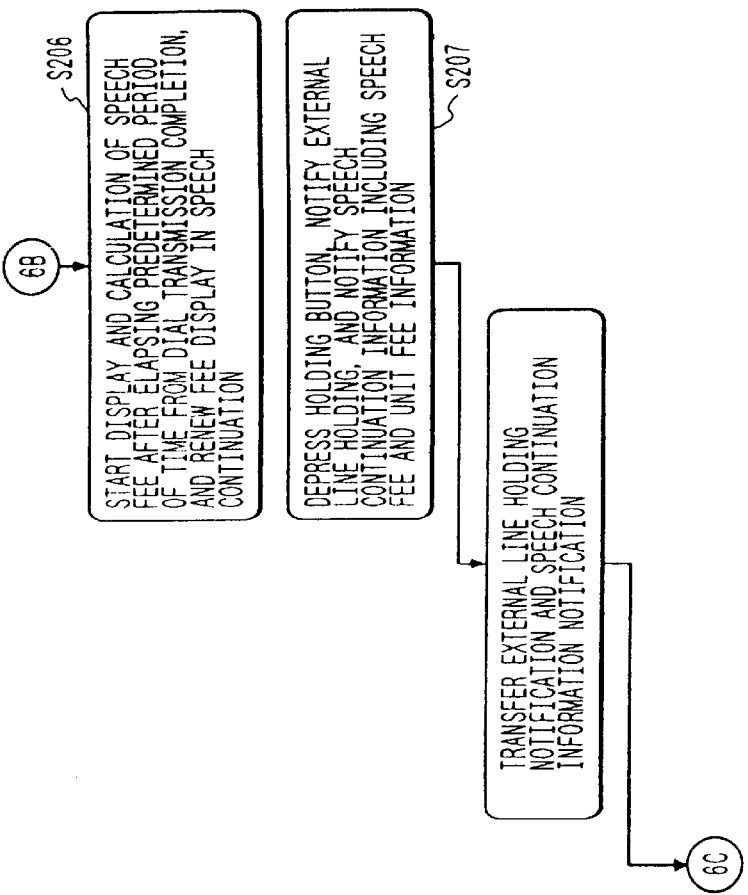

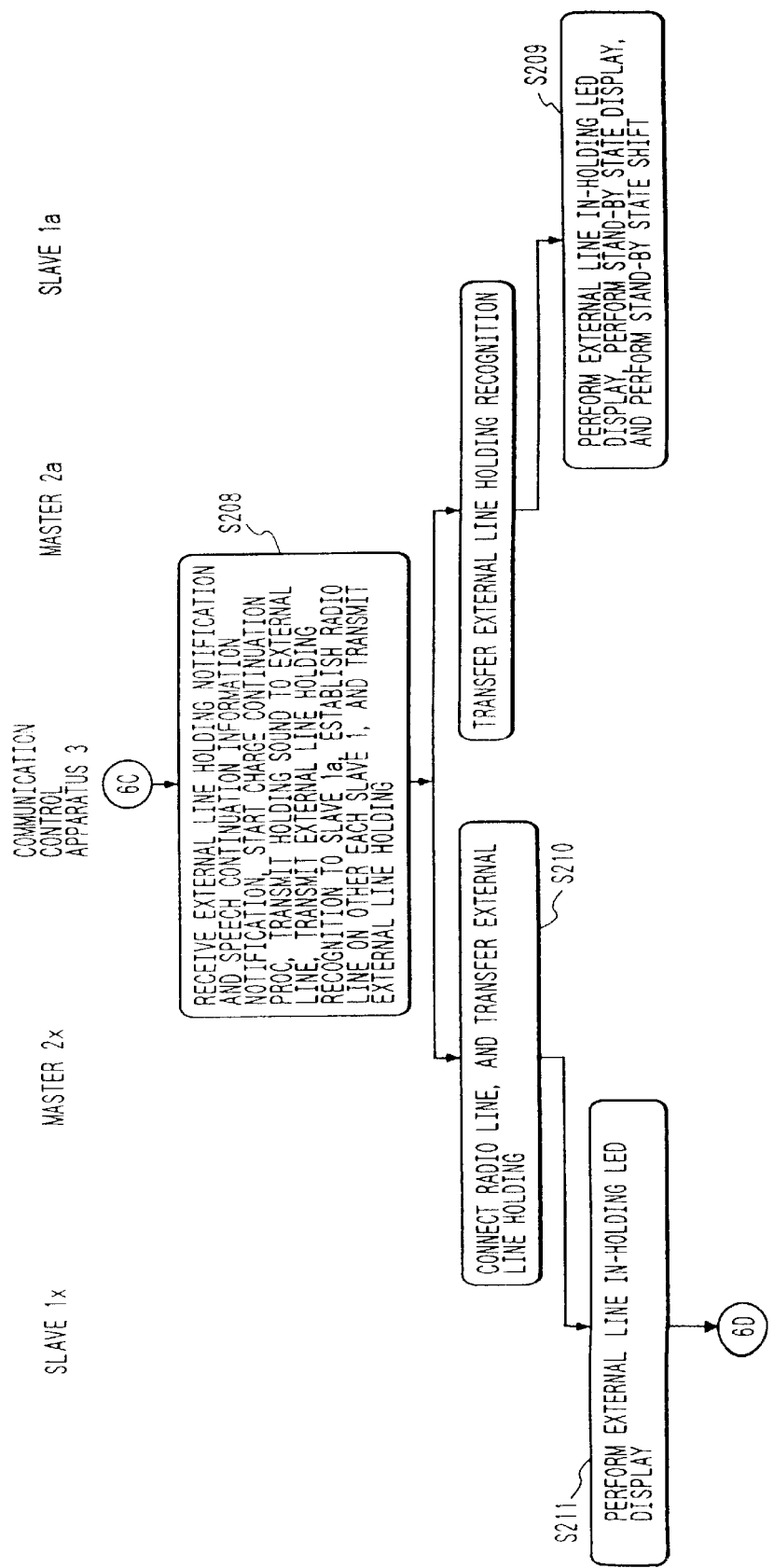

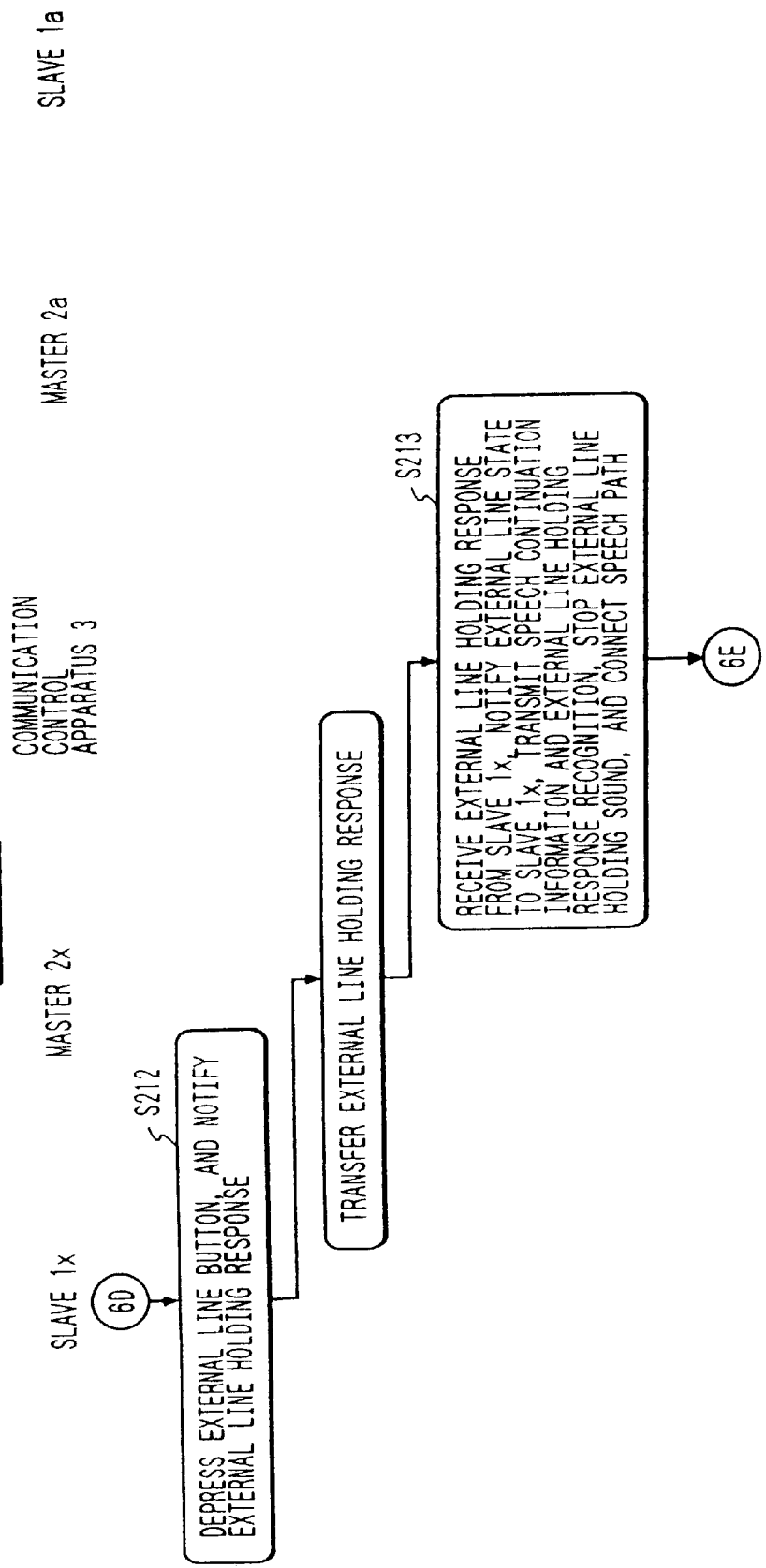

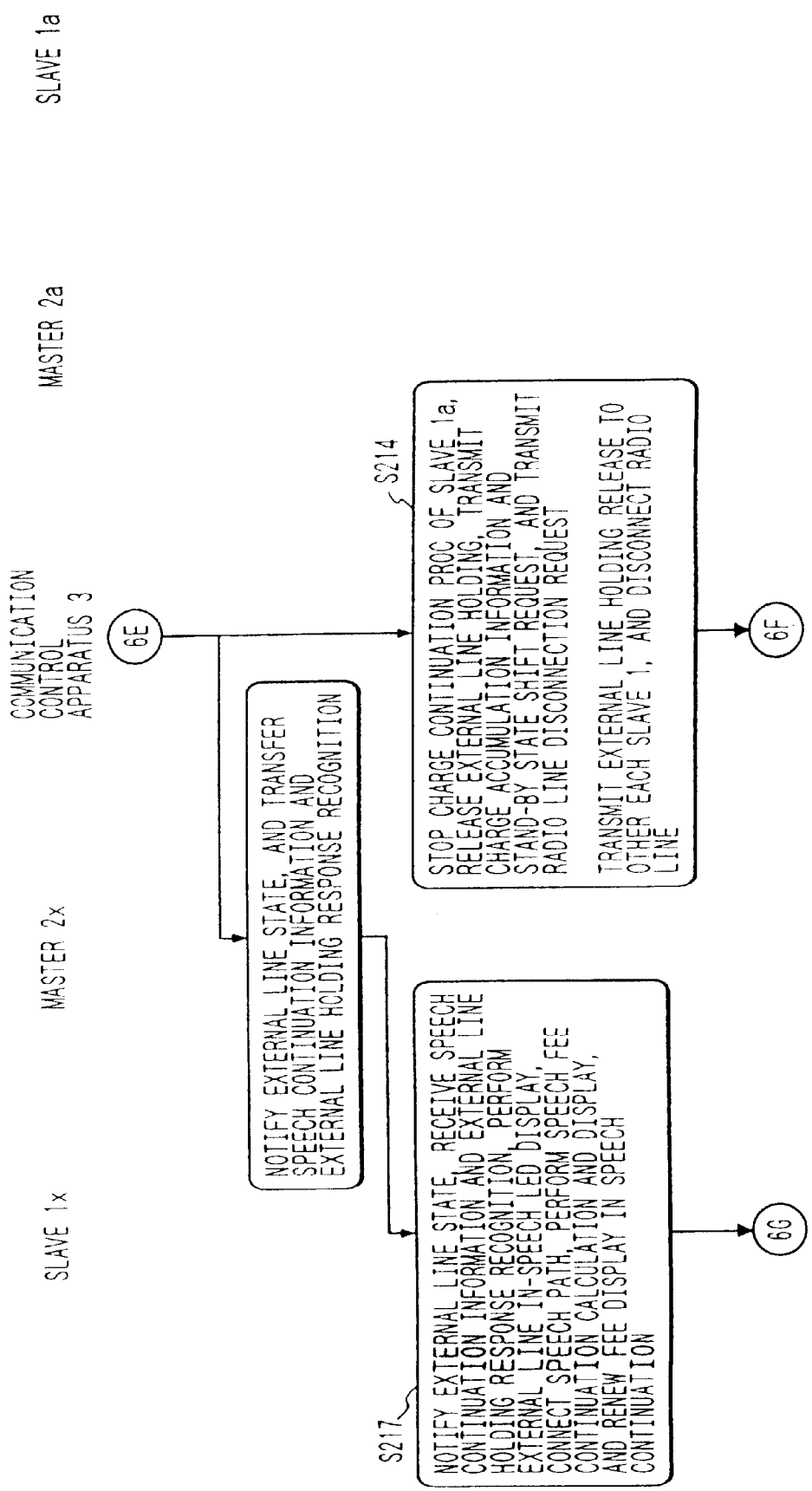

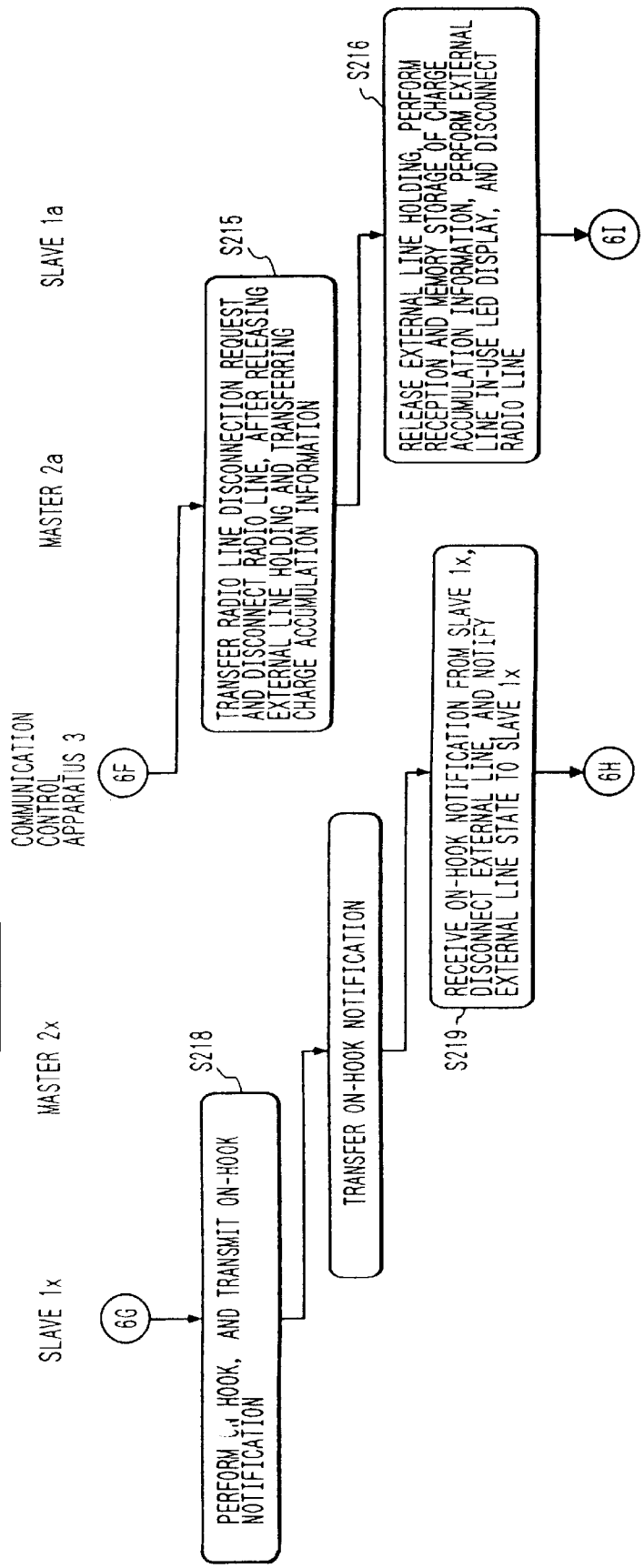

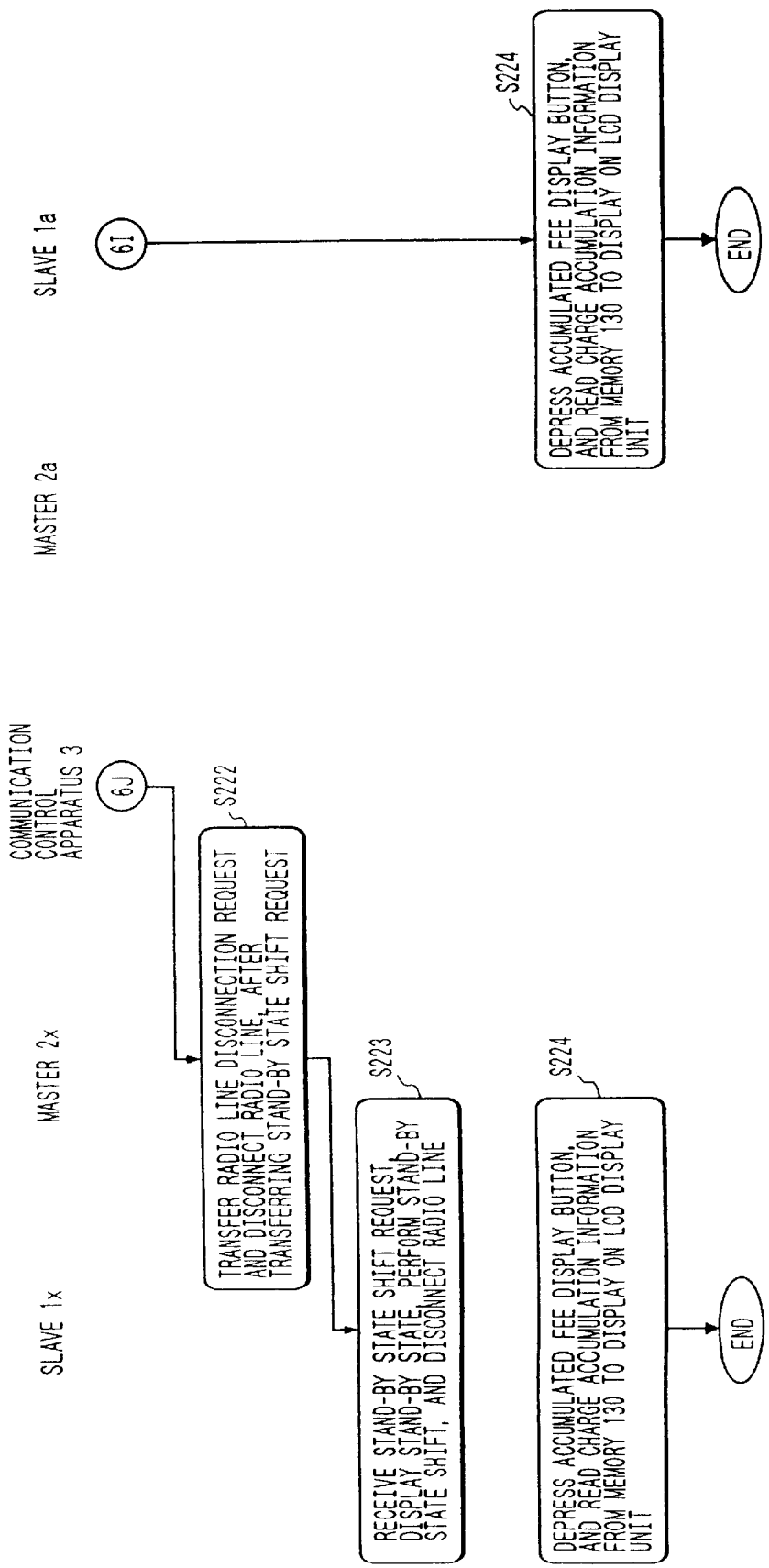

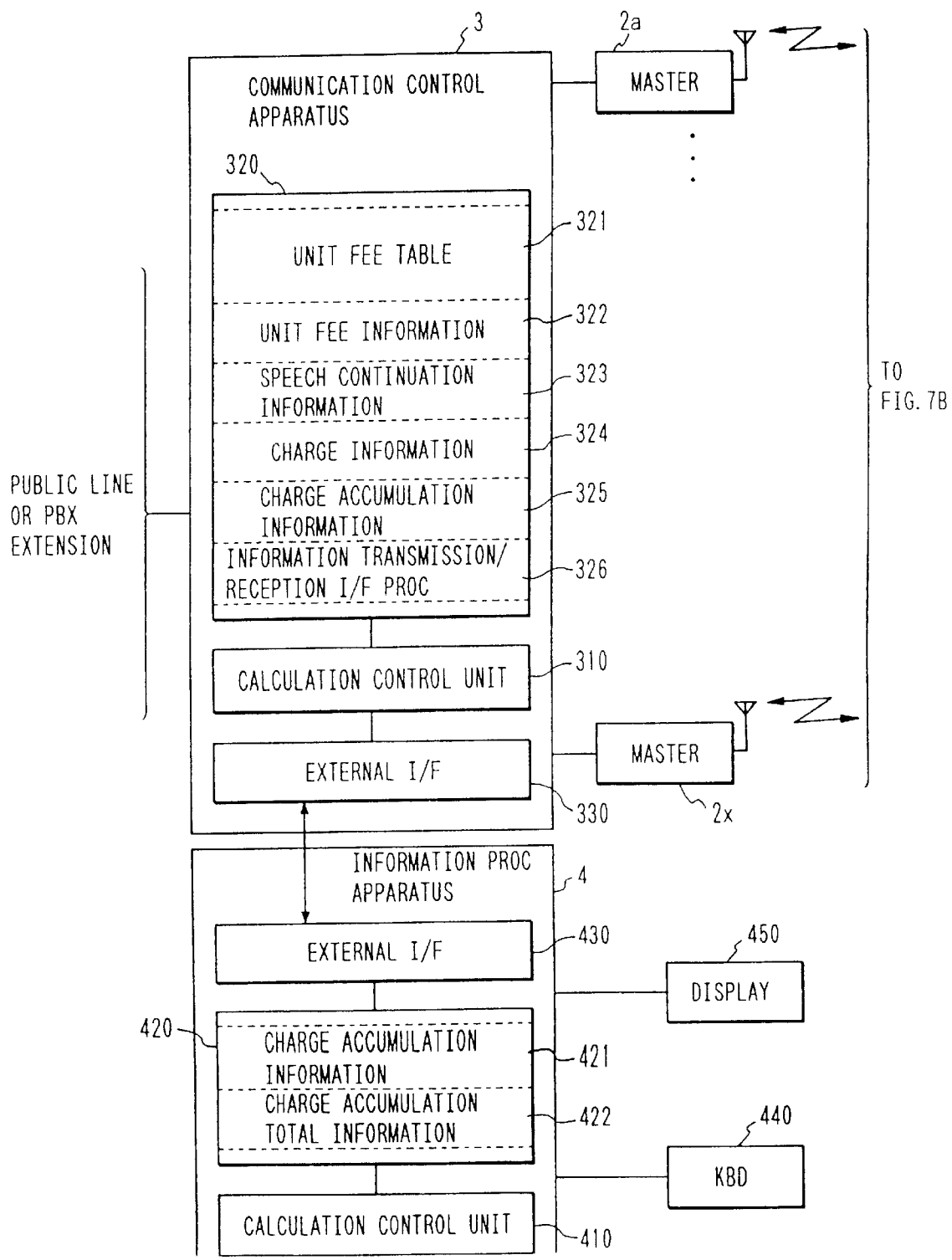

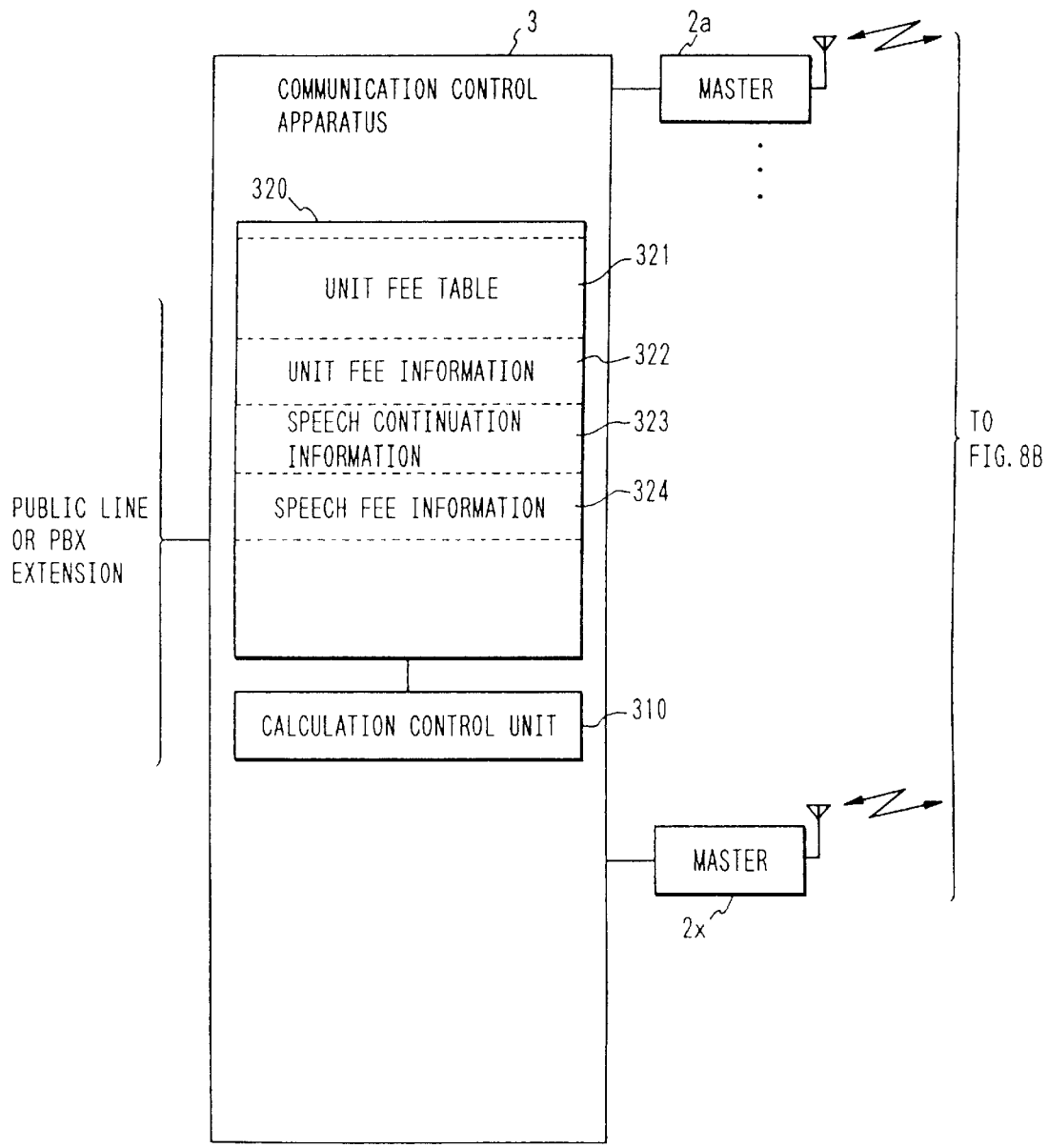

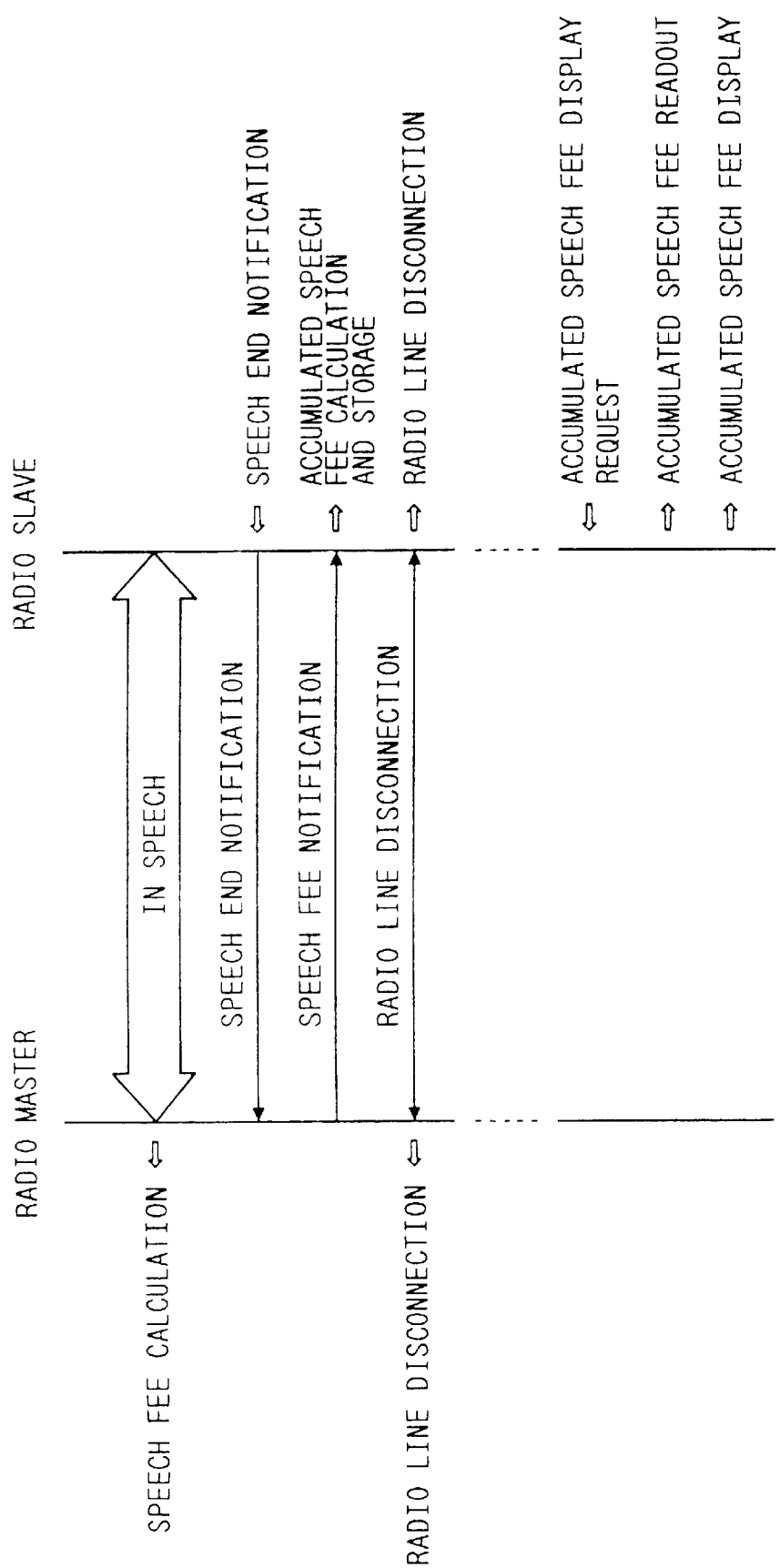

SPEECH FEE DISPLAY METHOD

CROSS-REFERENCES TO RELATED APPLICATIONS

This is a continuation application under 37 C.F.R. 1.53(b) of copending U.S. patent application Ser. No. 09/012,153, allowed on Aug. 11, 2000, which is a Continued Prosecution Application filed on Jan. 22, 1998, which is Continuation of application Ser. No. 08/428,045, filed Apr. 25, 1995 (abandoned).

BACKGROUND OF THE INVENTION

1. Field of the Invention

The invention relates to a method of displaying a speech fee which is required for a communication.

2. Related Background Art

Hitherto, in a communication apparatus having an accumulated speech fee display function, a speech fee is calculated and displayed during a communication and, after completion of the communication, an accumulated speech fee is calculated from the speech fee and is stored. When the user performs an operation such as a key depression or the like to request the accumulated speech fee display, the accumulated speech fee is read out and displayed to the user.

In a conventional wire exchange system, after a unit fee was decided by a communication control apparatus on the basis of dial input information from an extension, a fee in speech is calculated in the communication control apparatus and each time the fee is renewed, the display of the speech fee is notified to the extension and the fee in speech is displayed to the extension.

In a system such as a radio exchange system or the like in which control information and communication information are communicated via a common channel, there is a problem such that when a display notification of a speech fee is sent to a radio mobile station via a radio fixed station in the halfway of the speech, an unpleasant sound is heard to a speech person in association with such a notification.

SUMMARY OF THE INVENTION

It is an object of the invention to prevent that a communication in execution is obstructed by a notification of a speech fee.

Another object of the invention is that in the case where a second terminal communicates with a communication partner by a first terminal, a speech fee can be properly grasped even at the second terminal.

Still another object of the invention is to notify a speech fee without obstructing a communication of a terminal which responds to a holding operation.

Further another object of the invention is to improve a construction to accumulate speech fees of communications which were executed a plurality of number of times.

The above and other objects and features of the present invention will become apparent from the following detailed description and the appended claims with reference to the accompanying drawings.

BRIEF DESCRIPTION OF THE DRAWINGS

FIG. 2D which is composed of FIGS. 2D-1 and 2D-2 is a sequence chart of the first embodiment of the invention;

FIG. 3B which is composed of FIGS. 3B-1 and 3B-2 is a flowchart of the first embodiment of the invention;

FIG. 3C which is composed of FIGS. 3C-1 and 3C-2 is a flowchart of the first embodiment of the invention;

FIG. 3D which is composed of FIGS. 3D-1 and 3D-2 is a flowchart of the first embodiment of the invention;

FIG. 3E is a flowchart of the first embodiment of the invention;

FIG. 6A which is composed of FIGS. 6A-1 and 6A-2 is a flowchart of the second embodiment of the invention;

FIG. 6B which is composed of FIGS. 6B-1 and 6B-2 is a flowchart of the second embodiment of the invention;

FIG. 6C which is composed of FIGS. 6C-1 and 6C-2 is a flowchart of the second embodiment of the invention;

FIG. 6E is a flowchart of the second embodiment of the invention;

FIG. 12 is a sequence chart of the eighth embodiment of the invention.

DETAILED DESCRIPTION OF THE PREFERRED EMBODIMENTS

Figure 2A:
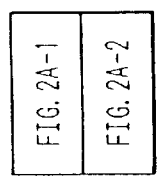
FIG. 2A which is composed of FIGS. 2A-1 and 2A-2 is a sequence chart of the first embodiment of the invention.

A radio telephone system embodying the invention will now be described in detail with reference to the drawings.

FIGS. 1A and 1B are block diagrams showing a first radio telephone system embodying the invention.

The system comprises: a cordless slave 1 as a radio mobile station; a cordless master 2 as a radio fixed station; and a m main apparatus (communication control apparatus) 3 of a PBX or a key telephone system as a communication control apparatus.

The slave 1 has: a calculation control unit 110 to control the slave 1; a memory 120 to store unit fee information 121, speech fee information 122, speech time information 123, charge accumulation information 124, and the like; an external line LED 130; a dial input unit 140 constructed by a ten-key and the like; and an LCD display unit 150 to display a speech fee or the like. The main apparatus 3 has: a calculation control unit 310 to control the main apparatus 3; and a memory 320 in which a unit fee table 321, unit fee information 322, speech continuation information 323, charge information 324, and charge accumulation information 325 have been stored. In this case, as contents of the charge accumulation information, an accumulated charge of each extension, an accumulated charge of each external line, an accumulated charge of each extension group, an accumulated charge of each external line group, and the like are included.

Figure 1:
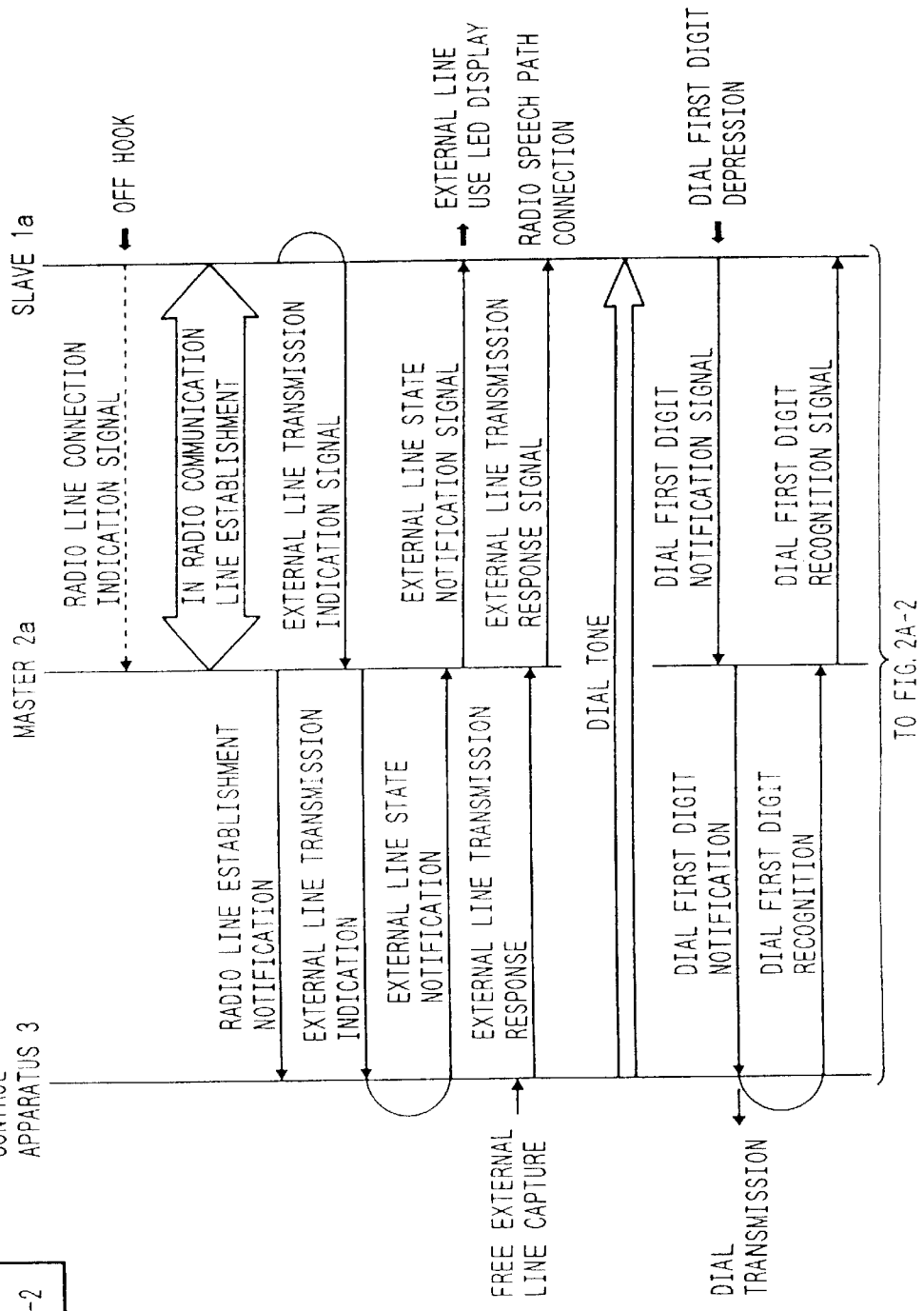
FIG. 1 which is composed of FIGS. 1A and 1B is a block diagram of the first embodiment of the invention.

FIGS. 2A-1 to 2D-2 are sequence charts showing the operation of the radio telephone system of the embodiment. FIGS. 3A-1 to 3E are flowcharts showing the operation of the radio telephone system of the embodiment.

First, when a slave 1a is off-hooked, the calculation control unit 110 of the slave which has been set to an off-hook automatic response establishes a radio communication line between the slave 1a and a master 2a and notifies an external line transmission indication to the communication control apparatus 3 via the master 2a (S101).

The calculation control unit 310 of the communication control apparatus 3 receives the external transmission indication from the slave 1a via the master 2a and notifies information indicative of the free external line to the slave 1a via the master 2a. When there is a free external line, the control unit 310 captures the free external line and notifies a fact that the free external line can be captured to the slave 1a via the master 2a by an external line transmission response and connects a dial tone from a local line to a speech path of the slave 1a (S102).

The calculation control unit 110 of the slave 1a changes a lighting state of the external line LED 130 on the basis of the free external line information from the communication control apparatus 3 via the master 2a. When a dial tone from the speech path is heard, a dial input is executed from the dial input unit 140 in order to perform an external line transmission. At this time, the calculation control unit 110 transmits the dial to the communication control apparatus 3 via the master 2a (S103).

When the calculation control unit 310 which received the dial from the slave 1a via the master 2a receives a dial of a predetermined digit, unit fee information of a transmission destination is calculated from the unit fee table 321 stored in the memory 320 and stores into the memory 320. During the dial reception, the control unit 310 notifies the unit fee information 322 to the slave 1a via the master 2a (S104).

The slave 1a which received the unit fee information notification from the communication control apparatus 3 via the master 2a stores the unit fee information to the memory 120 (S105).

The calculation control unit 110 of the slave 1a which finished all of the dial input from the dial input unit 140 and the dial transmission to the communication control apparatus 3 starts the counting operation of the speech elapsed time and the storage to the memory 120 after the elapse of a predetermined time. In step S105, the control unit 110 calculates the speech fee on the basis of the unit fee information 121 and speech time information 123 stored in the memory 120 and starts the storage to the memory 120 and also starts the display of the speech fee 122 to the LCD display unit 150 (S106).

After completion of the dial transmission to the local line, the calculation control unit 310 of the communication control apparatus 3 starts the execution of a charging process on the basis of the unit fee information 322 stored in the memory 320 from an inversion detection from a partner side or after the elapse of a predetermined time and stores the charge information to the memory 320 (S107). The communication control apparatus 3 has an inversion (polarity inversion) detecting circuit of the local line.

When the user of the slave 1a depresses a holding button to hold a speech, the calculation control unit 110 of the slave 1a transmits an external line holding notification to the communication control apparatus 3 (S108).

The calculation control unit 310 of the communication control apparatus 3 which received the external line holding notification from the slave 1a via the master 2a transmits a holding sound to the relevant external line and transmits an external line holding recognition and a stand-by state shift request to the slave 1a via the master 2a. For the other slave 1 in the free state, first, a radio line connection request is transmitted to the master 2 and a radio line is established between the master 2 and the slave 1. Subsequently, when a radio line connection recognition is received from the master 2, the control unit 310 transmits an external line holding command via the master 2, thereby notifying that the external line was held (S109).

The calculation control unit 110 of the slave 1a which received the external line holding recognition and stand-by state shift request from the communication control apparatus 3 via the master 2a changes the external line LED 130 to a display in which the relevant external line is in a holding state, allows the LCD display unit 150 to display a stand-by state, and shifts to the stand-by state (S110).

A master 2x which received the radio line connection request from the communication control apparatus 3 establishes a radio communication line between the master 2x and a slave 1x and transmits a radio line connection recognition to notify that the radio communication line has been established to the communication control apparatus 3, after that, transfers the external line holding command from the communication control apparatus 3 to the slave 1x (S111).

The calculation control unit 110 of the slave 1x which received the external line holding command from the communication control apparatus 3 via the master 2x changes the external line LED to a display indicating that the external line is in a holding state (S112).

In the case where the user of the slave 1x depresses the external line LED showing the external line holding display and responds the holding, the calculation control unit 110 of the slave 1x transmits the external line holding response notification to the communication control apparatus 3 (S113).

The calculation control unit 310 of the communication control apparatus 3 which received the external line holding response notification via the master 2x transmits the external line state notification to the slave 1x and also transmits the unit fee information 322 and speech continuation information 323 which were stored in the memory 320 and the external line holding response recognition to the slave 1x via the master 2x. The control unit 310 stops the transmission of the holding sound to the external line and connects the speech path to the slave 1x (S114).

Further, the calculation control unit 310 of the communication control apparatus stops the charging process to the slave 1a and newly starts the charging process to the slave 1x. The control unit 310 executes a charge accumulating process of the slave 1a and stores the charge accumulation information until the slave 1x performs a holding response into the memory 320. The control unit 310 transmits a release of external line holding, charge accumulation information 325, and stand-by state shift request to the slave 1a via the master 2. The control unit 310 transmits an external line holding release command to each of the other slaves 1 via the master 2 and transmits a radio line disconnection request to the slave 1a via the master 2a and to the other slaves 1 via the master 2 (S115).

The master 2a which received the external line holding release, charge accumulation information, and stand-by state shift request from the communication control apparatus 3 transfers them to the slave 1a. After that, the master 2a receives the radio line disconnection request from the communication control apparatus 3 and transfers the radio line disconnection request to the slave 1a. When the master 2a receives a radio line disconnection recognition from the slave 1a, it disconnects the radio communication line between the master 2a and the slave 1a (S117).

The calculation control unit 110 of the slave 1a which received the external line holding release, charge accumulation information, and stand-by state shift request from the master 2a sets the external line LED 130 to an in-use state display and stores the charge accumulation information to the memory 120 and allows the LED display unit 150 to display the stand-by state. After that, when the control unit 110 receives the radio line disconnection request from the communication control apparatus 3 via the master 2a, the control unit 110 transmits a radio line disconnection recognition to the communication control apparatus 3 via the master 2a, thereby disconnecting the radio line (S118).

The calculation control unit 110 of the slave 1x which received the external line state notification, unit fee, speech continuation information, external line holding response recognition from the communication control apparatus 3 via the master 2x sets the external line LED 130 to an external line in-speech display and connects a radio speech path. The control unit 110 stores the unit fee and speech continuation information to the memory 120, calculates a speech fee on the basis of those two information, starts the storage to the memory 120, and starts the display of the speech fee 122 to the LCD display unit 150. In a manner similar to the above, the speech fee display is renewed every elapse of a unit time until the end of the speech (S116).

When the slave 1x is on-hooked, an on-hook notification is sent to the communication control apparatus 3 via the master 2x (S119).

The calculation control unit 310 of the communication control apparatus 3 which received the on-hook notification from the slave 1x via the master 2 stops the charging process and executes the charge accumulating process and stores the charge accumulation information to the memory 320. The control unit 310 disconnects the external line and transmits the external line state notification, charge accumulation information 325, and stand-by state shift request to the slave 1x via the master 2x, and after that, transmits a radio line disconnection request (S120).

The master 2x which received the external line state notification, charge accumulation information, and stand-by state shift request from the communication control apparatus 3 transfers them to the slave 1x and, after that, transfers the radio line disconnection request from the communication control apparatus 3 to the slave 1x. The master 2x receives a radio line disconnection recognition from the slave 1x and transfers to the communication control apparatus 3 and, after that, disconnects the radio line (S121).

The calculation control unit 110 of the slave 1x which received the external line state notification, charge accumulation information, and stand-by state shift request via the master 2x sets the external line LED to a free state display, stores the charge accumulation information to the memory 120, allows the LCD display unit 150 to display the stand-by state, and shifts to the stand-by state. When the control unit 110 receives the radio line disconnection request from the communication control apparatus 3 via the master 2x, the control unit 110 transmits a radio line disconnection recognition to the communication control apparatus 3 via the master 2x and, after that, disconnects the radio line (S122).

When the user of the slave 1a or 1x in the stand-by state depresses a display button of an accumulated fee, the calculation control unit 110 of the slave 1a or 1x reads out the charge accumulation information 124 stored in the memory 120 and displays to the LCD display unit (S123).

By embodying the first embodiment, there are the following peculiar effects.

Since the unit fee table 321 for charge calculation is provided in the communication control apparatus 3, such a table can be commonly used.

Since a charge management is executed in a lump by the communication control apparatus 3, not only the accumulation charge for every extension but also the accumulation charge for every external line, accumulation charge for every extension group, accumulation charge for every external line group, and the like can be easily managed. Further, since the above information is transmitted as charge accumulation information to the slave 1, the accumulation charge information can be displayed by all of the slaves after completion of the external line speech or the external line speech holding.

Since the charge information 324 is managed in the communication control apparatus 3 without intervening a radio wave, the charge information management and accumulation charge information management can be performed more accurately irrespective of whether the establishment of a radio link has succeeded or failed.

Figure 4B:
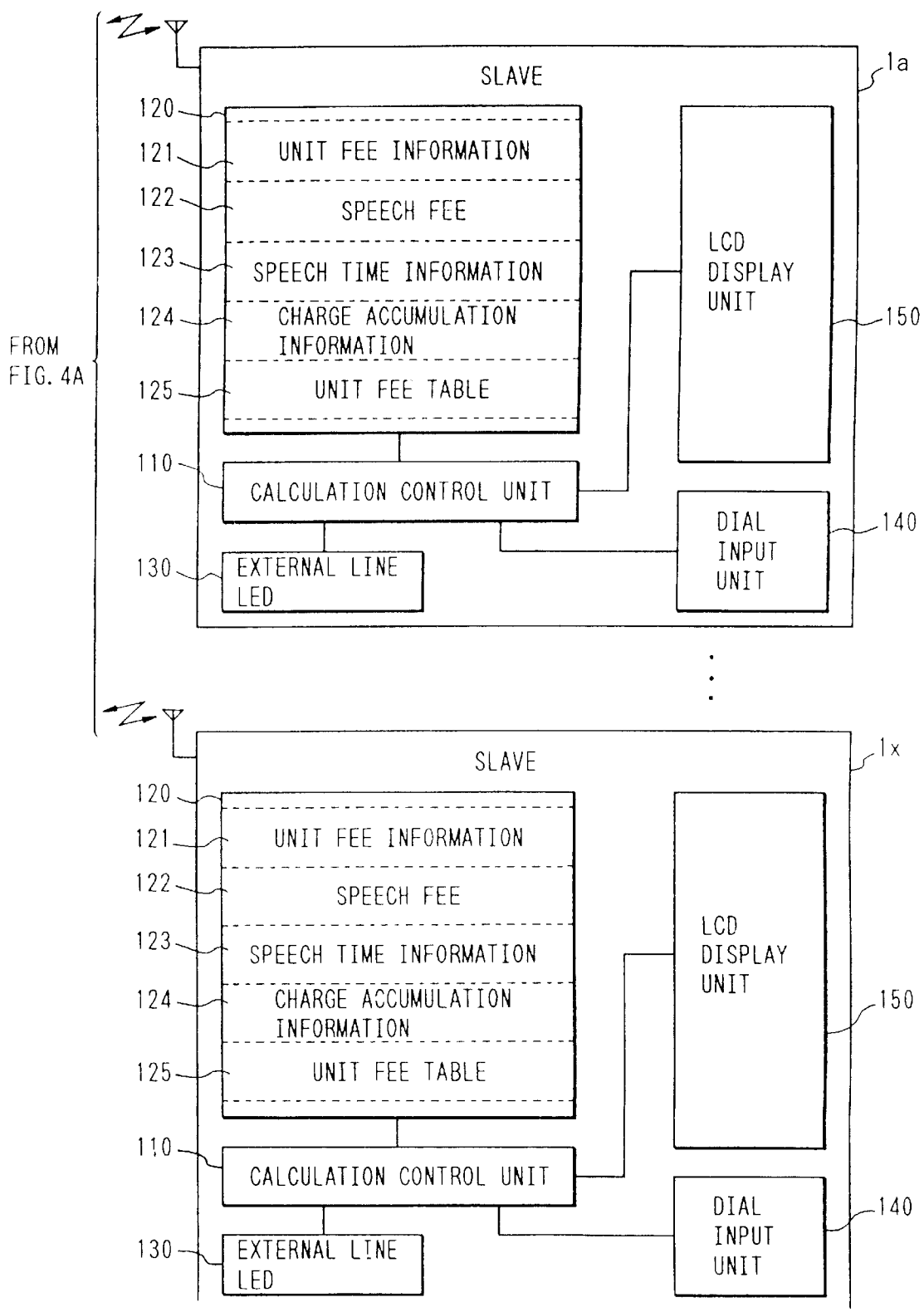
FIG. 4 which is composed of FIGS. 4A and 4B is a block diagram of the second embodiment of the invention.
Figures 2, 5A:
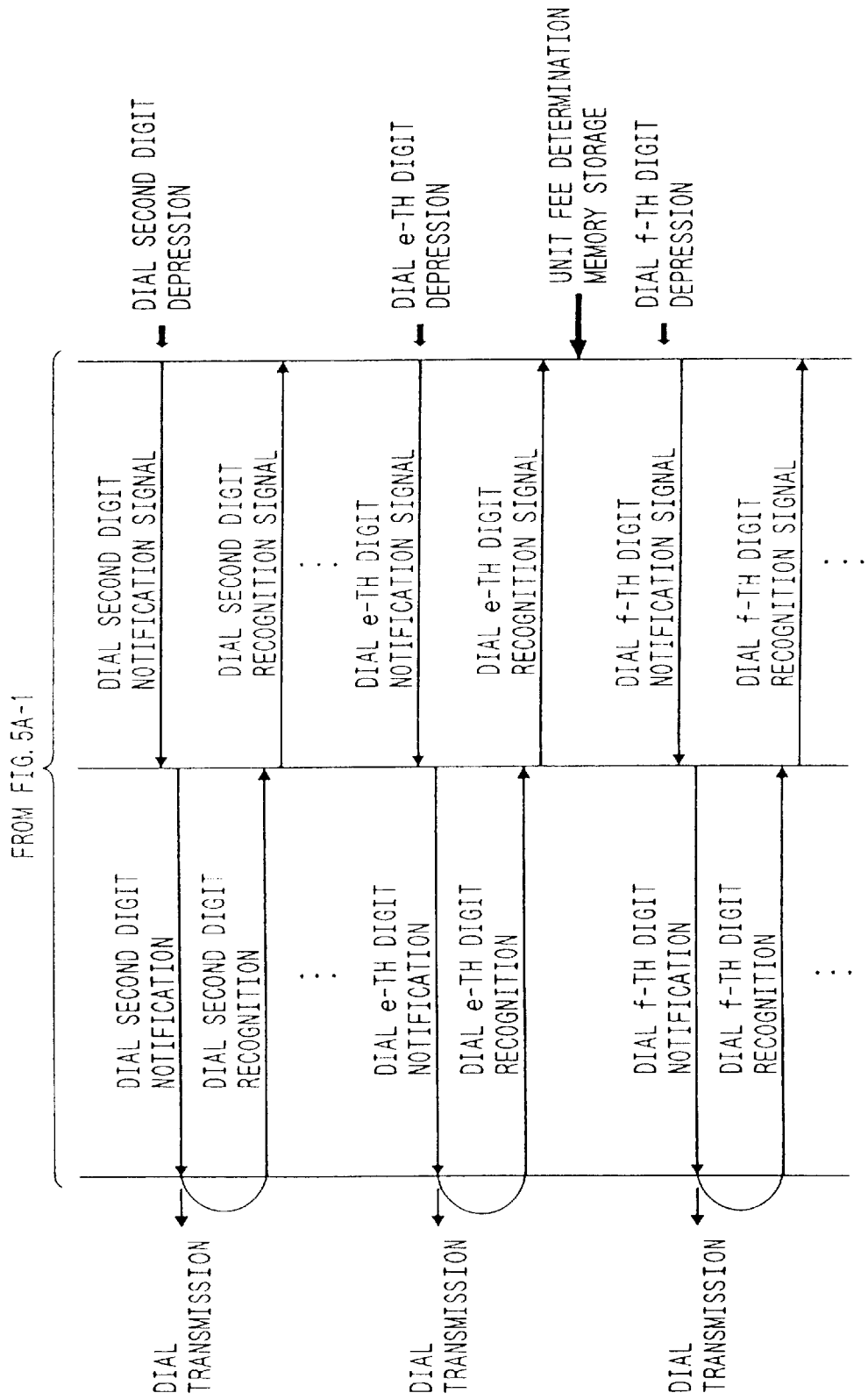
FIG. 5A which is composed of FIGS. 5A-1 and 5A-2 is a sequence chart of the second embodiment of the invention.
Figures 2, 5B:
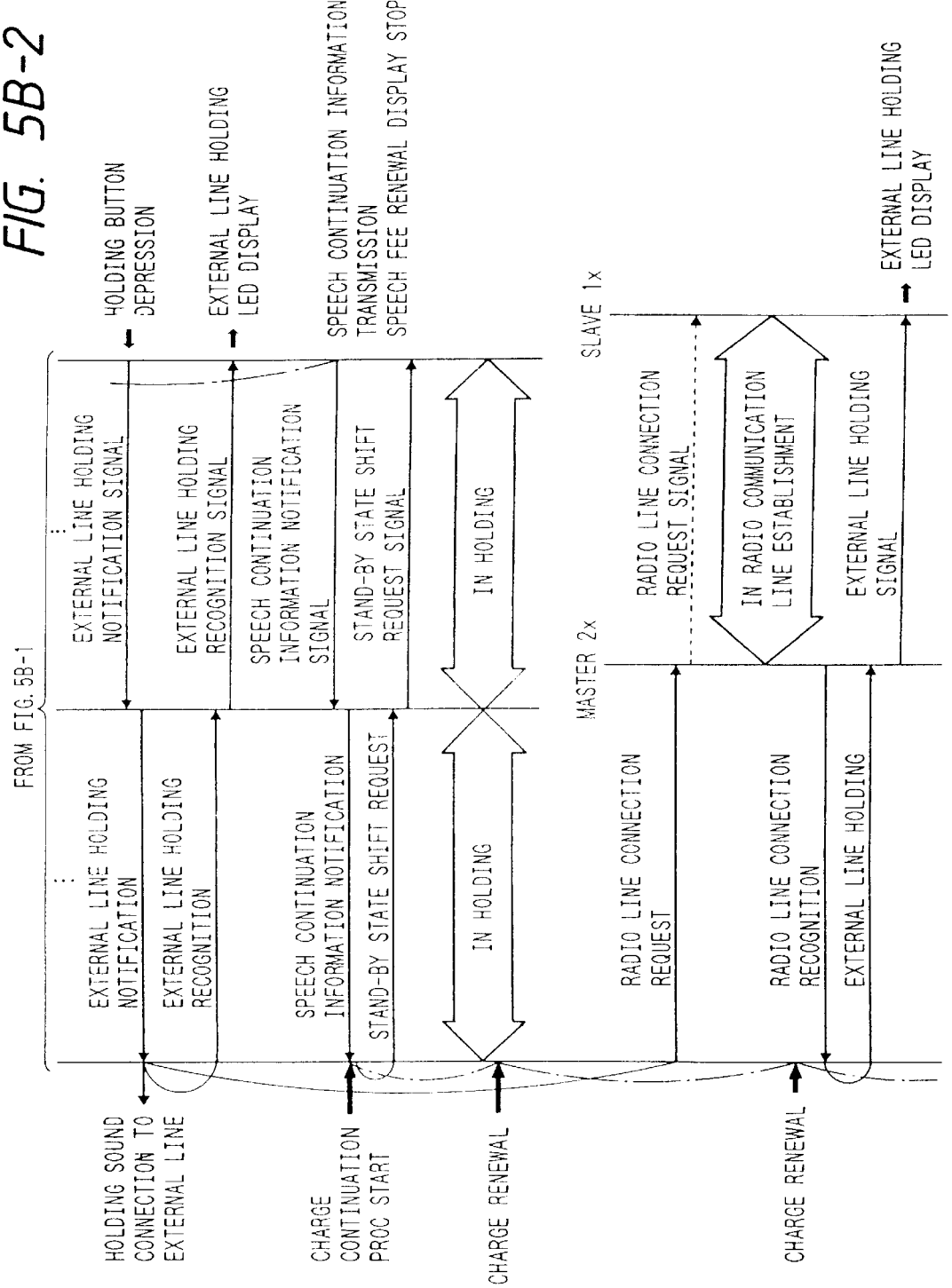
FIG. 5B which is composed of FIGS. 5B-1 and 5B-2 is a sequence chart of the second embodiment of the invention.
Figures 2, 5C:
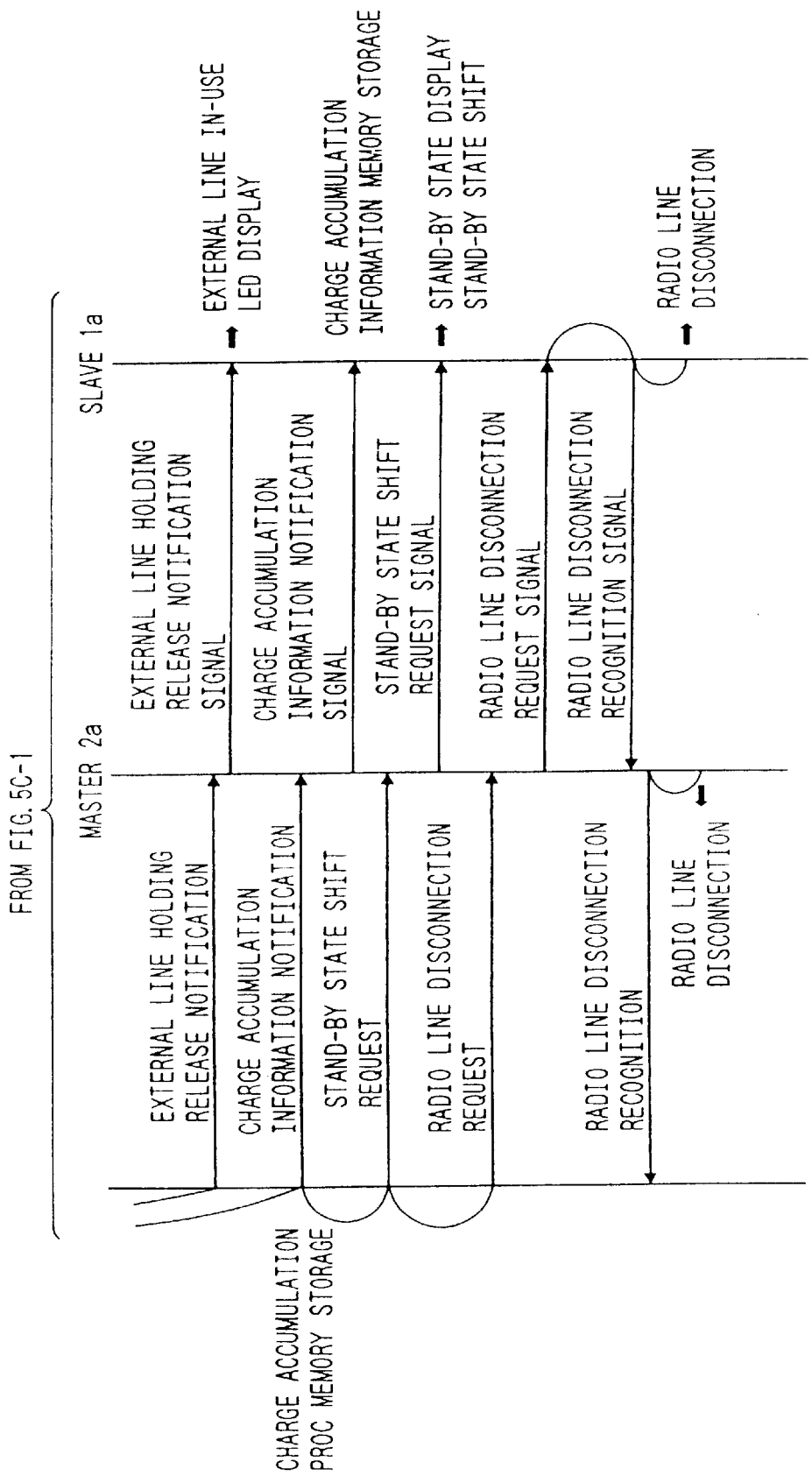
FIG. 5C which is composed of FIGS. 5C-1 and 5C-2 is a sequence chart of the second embodiment of the invention.
Figures 1, 5D:
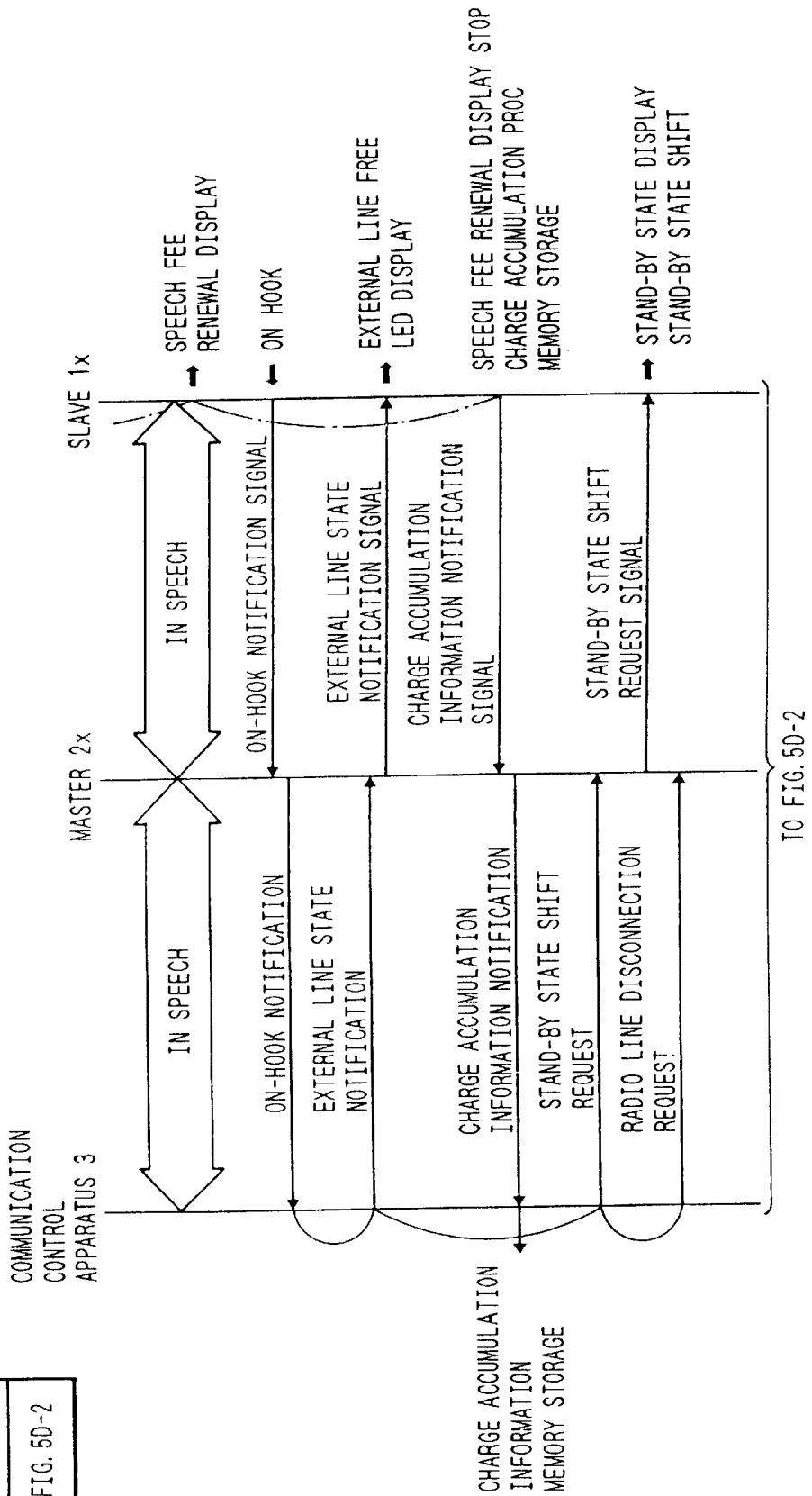
FIG. 5D which is composed of FIGS. 5D-1 and 5D-2 is a sequence chart of the second embodiment of the invention.

FIGS. 4A and 4B are block diagrams showing a second radio telephone system embodying the invention.

In the embodiment, as shown in the diagram, the unit fee table in the memory 320 of the communication control apparatus 3 shown in FIGS. 1A and 1B of the first embodiment is held in the memory 120 of each slave 1 and the unit fee information in the memory 320 is included in the speech continuation information 323. The other construction of the system of the second embodiment except the above different point is common to that in the above first embodiment (FIGS. 1A and 1B).

Figures 2, 6D:
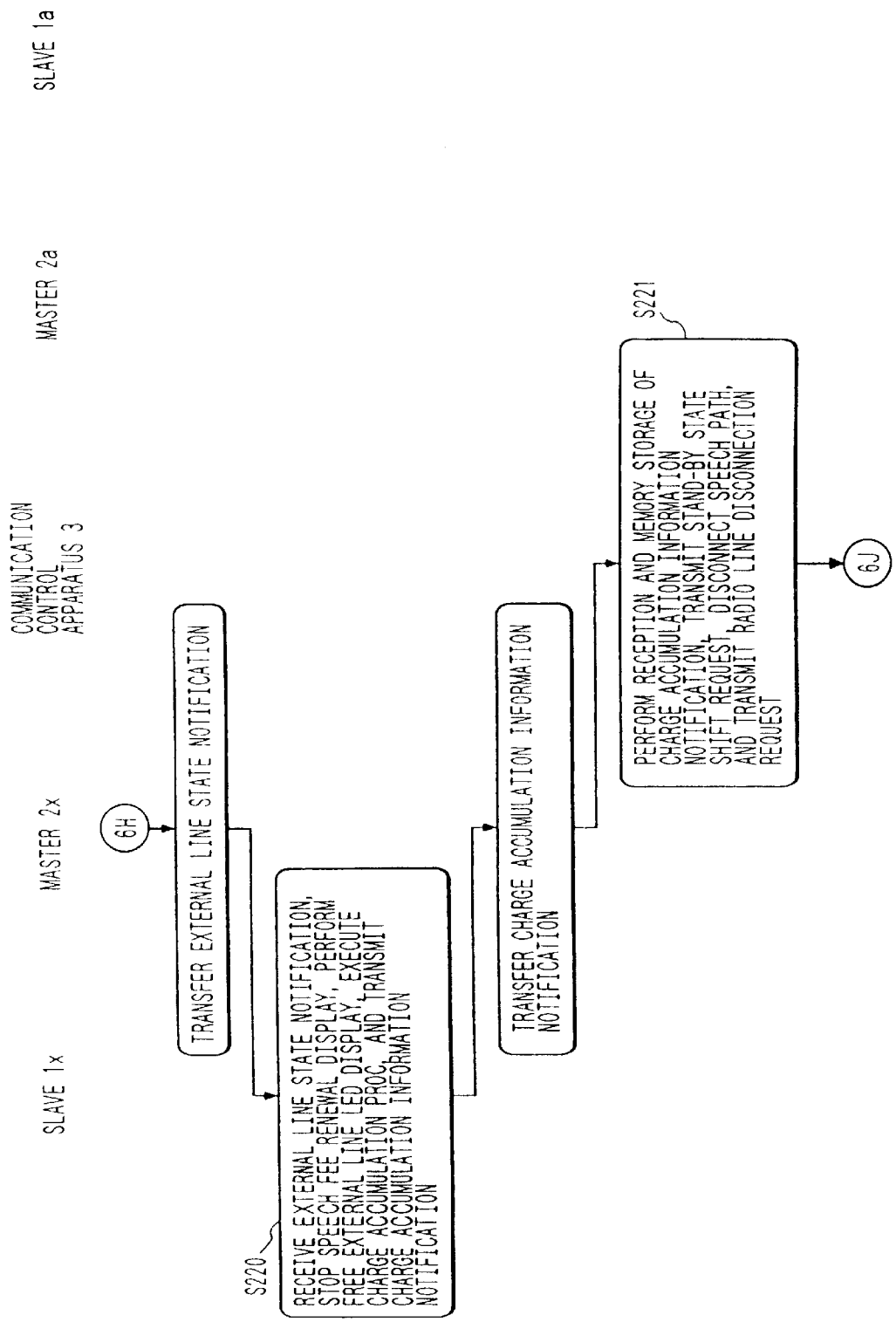
FIG. 6D which is composed of FIGS. 6D-1 and 6D-2 is a flowchart of the second embodiment of the invention.

FIGS. 5A-1 to 5D-2 are sequence charts showing the operation of the radio telephone system of the second embodiment. FIGS. 6A-1 to 6E are flowcharts showing the operation of the radio telephone system of the embodiment.

When the slave 1a is first off-hooked, the calculation control unit 110 of the slave which has been set to an off-hook automatic response establishes a radio communication line between the slave 1a and the master 2a and notifies an external line transmission indication to the communication control apparatus via the master 2a (S201).

The calculation control unit 310 of the communication control apparatus 3 receives the external line transmission indication from the slave 1a via the master 2a and notifies the information indicative of the free external line to the slave 1a via the master 2a. When there is a free external line, the control unit 310 captures the free external line and notifies a fact-that the free external line could be captured to the slave 1a via the master 2a by an external line transmission response. The control unit 310 connects a dial tone-from a local line to a speech path of the slave 1a (S202).

The calculation control unit 110 of the slave 1a changes a lighting state of the external line LED 130 on the basis of the free external line information from the communication control apparatus 3 via the master 2a. When the dial tone from the speech path is heard, since this means that an external line transmission has been performed, a dial input is executed from the dial input unit 140. In this instance, the calculation control unit 110 transmits the dial to the communication control apparatus 3 via the master 2a (S203).

The calculation control unit 310 of the communication control apparatus 3 receives the dial from the slave 1a via the master 2a and transmits the dial to the external line (S204).

When the dial numbers corresponding to a predetermined digit are inputted, the calculation control unit 110 of the slave 1a calculates the unit fee information on the transmission destination side from the unit fee table 121 stored in the memory 120 and stores into the memory 120 (S205).

The calculation control unit 110 of the slave 1a which finished all of the dial input from the dial input unit 140 and the dial transmission to the communication control apparatus 3 starts the counting operation of a speech elapsed time and the storage of the speech time information to the memory 120 after the elapse of a predetermined time. In step S205, the control unit 110 calculates the speech fee on the basis of the unit fee information 121 and speech time information 123 stored in the memory 120, starts the storage to the memory 120, and starts the display of the speech fee 122 to the LCD display unit 150 (S206).

When the user of the slave 1a depresses a holding button to hold the speech, the calculation control unit 110 of the slave 1a transmits an external line holding notification and a speech continuation information notification including the speech fee and unit fee information to the communication control apparatus 3 (S207).

The calculation control unit 310 of the communication control apparatus 3 which received the external line holding notification and speech continuation information notification from the slave 1a via the master 2a transmits a holding sound to the relevant external line and starts a charge continuing process regarding the relevant external line. Further, the control unit 310 transmits an external line holding recognition and a stand-by state shift request to the slave 1a via the master 2a. For the other slaves 1 in the free state, first, radio lines connection request are transmitted to the master 2 and a radio line is established between the master 2 and the slaves 1. Subsequently, when a radio line connection recognition is received from the master 2, the control unit 310 transmits an external line holding command via the master 2 and notifies that the external line was held (S208).

The calculation control unit 110 of the slave 1a which received the external line holding recognition and stand-by state shift request from the communication control apparatus 3 via the master 2a changes the external line LED 130 to a display indicating that the relevant external line is in a holding state, displays the stand-by state to the LCD display unit 150, and shifts to the stand-by state (S209).

The master 2x which received the radio line connection request from the communication control apparatus 3 establishes a radio communication line between the master 2x and the slave 1x and transmits a radio line connection recognition to the communication control apparatus 3 in order to notify that the radio communication line was established and, after that, transfers the external line holding command from the communication control apparatus 3 to the slave 1x (S210).

The calculation control unit 110 of the slave 1x which received the external line holding command from the communication control apparatus 3 via the master 2x changes the external line LED to a display indicating that the relevant external line is in a holding state (S211).

When the user of the slave 1x depresses the external line LED displaying the external line in-holding and responds to the holding, the calculation control unit 110 of the slave 1x transmits the external line holding response notification to the communication control apparatus 3 (S212).

The calculation control unit 310 of the communication control apparatus 3 which received the external line holding response notification via the master 2x transmits the external line state notification to the slave 1x and also transmits the speech continuation information 323 and external line holding response recognition stored in the memory 320 to the slave 1x via the master 2x. The control unit also stops the transmission of a holding sound to the external line and connects the speech path to the slave 1x (S213).

Further, the calculation control unit 310 of the communication control apparatus stops the charge continuing process of the relevant external line, executes the charge accumulating process with respect to the slave 1a and the relevant external line, and stores the charge accumulation information to the memory 320. The control unit 310 transmits the external line holding release, the charge accumulation information 325, and stand-by state shift request to the slave 1a via the master 2a, transmits an external line holding release command to each of the other slaves 1 via the master 2, and transmits a radio line disconnection request to the slave 1a via the master 2a and to the other slaves 1 via the master 2 (S214).

The master 2a which received the external line holding release, charge accumulation information, and stand-by state shift request from the communication control apparatus 3 transfers those commands to the slave 1a. After that, the master 2a receives the radio line disconnection request from the communication control apparatus 3 and transfers the radio line disconnection request to the slave 1a. When the radio line disconnection recognition from the slave 1a is received, the radio communication line with the slave 1a is disconnected (S215).

The calculation control unit 110 of the slave 1a which received the external line holding release, charge accumulation information, and stand-by state shift request from the master 2a sets the external line LED 130 to the in-use state display, stores the charge accumulation information to the memory 120, and displays the stand-by state to the LCD display unit 150. After that, when the radio line disconnection request is received from the communication control apparatus 3 via the master 2a, the control unit 110 transmits the radio line disconnection recognition to the communication control apparatus 3 via the master 2a and disconnects the radio line (S216).

The calculation control unit 110 of the slave 1x which received the external line state notification, unit charge, speech continuation information, and external line holding response recognition from the communication control apparatus 3 via the master 2x sets the external line LED 130 to the external line in-speech display, connects the radio speech path, divides the speech continuation information to the unit fee information, speech time information, speech fee, and the like, and stores into the memory 120. The control unit 110 calculates a speech fee on the basis of the unit fee information and the speech time information, starts the renewal and storage to the memory 120, and starts the display of the speech fee 122 to the LCD display unit 150. In a manner similar to the above, the speech fee and display are renewed every elapse of a unit time until the end of the speech (S217).

When the slave 1x is on-hooked, the on-hook notification is sent to the communication control apparatus 3 via the master 2x (S218).

The calculation control unit 310 of the communication control apparatus 3 which received the on-hook notification from the slave 1x via the master 2 disconnects the external line and transmits the external line state notification to the slave 1x via the master 2x (S219).

The calculation control unit 110 of the slave 1x which received the external line state notification via the master 2x sets the external line LED to the free state display, stops the speech fee renewal display, executes the charge accumulating process, and stores the charge accumulation information into the memory 120. Further, the stand-by state is displayed to the LCD display unit 150 and the charge accumulation information notification is transmitted to the communication control apparatus 3 (S220).

The calculation control unit 310 of the communication control apparatus 3 which received the charge accumulation information notification from the slave 1x via the master 2 stores the charge accumulation information to the memory 320. The control unit 310 disconnects the speech path and transmits the stand-by state shift request to the slave 1x via the master 2x and, after that, transmits the radio line disconnection request to the master 2x (S221).

The master 2x which received the stand-by state shift request from the communication control apparatus 3 transfers the stand-by state shift request to the slave 1x and, after that, transfers the radio line disconnection request from the communication control apparatus 3 to the slave 1x. The master 2x receives the radio line disconnection recognition from the slave 1x and transfers the radio line disconnection recognition to the communication control apparatus 3 and, after that, disconnects the radio line (S222).

The calculation control unit 110 of the slave 1x which received the stand-by state shift request via the master 2x displays the stand-by state to the LCD display unit 150 and shifts to the stand-by state. When the radio line disconnection request is received from the communication control apparatus 3 via the master 2x, the control unit 110 transmits the radio line disconnection recognition to the communication control apparatus 3 via the master 2x and, after that, disconnects the radio line (S223).

When the user of the slave 1a or 1x in the stand-by state depresses the display button of the accumulated fee, the calculation control unit 110 of the slave 1a or 1x reads out the charge accumulation information 124 stored in the memory 120 and displays to the LCD display unit (S224).

By embodying the second embodiment, the following peculiar effects are obtained.

Since the unit fee table 321 for a charge calculation is provided in the internal memory 120 of each slave 1, a series of processes from the decision of the unit fee to the renewal display of the speech fee and the like can be set to the closed processes in the slave 1.

Since the charge renewal management is executed in each of the slaves 1 during the speech, a load of the processes of the communication control apparatus 3 can be reduced. Moreover, since the accumulation charge information is transmitted to the communication control apparatus 3 after the end of the speech, not only the accumulation charge for every extension but also the accumulation charge for every external line, accumulation charge for every extension group, accumulation charge for every external line group, and the like can be managed by the communication control apparatus 3.

Even if the radio communication line between the slave 1a and the master 2a which was held is notification command to transfer information from a keyboard of the information processing apparatus 4 to the communication control apparatus 3 is inputted. The calculation control unit 410 of the information processing apparatus 4 which received the information transmission/reception notification command transmits an information transmission/reception notification to the communication control apparatus 3 through the external interface 430.

The calculation control unit 310 in the communication control apparatus 3 which received the information transmission/reception notification through the external interface 330 activates an information transmission/reception interface process in the memory 320.

The operations similar to those shown in FIGS. 2A-1 to 2D-2 and 3A-1 to 3E are executed after that.

Figures 2, 2B:
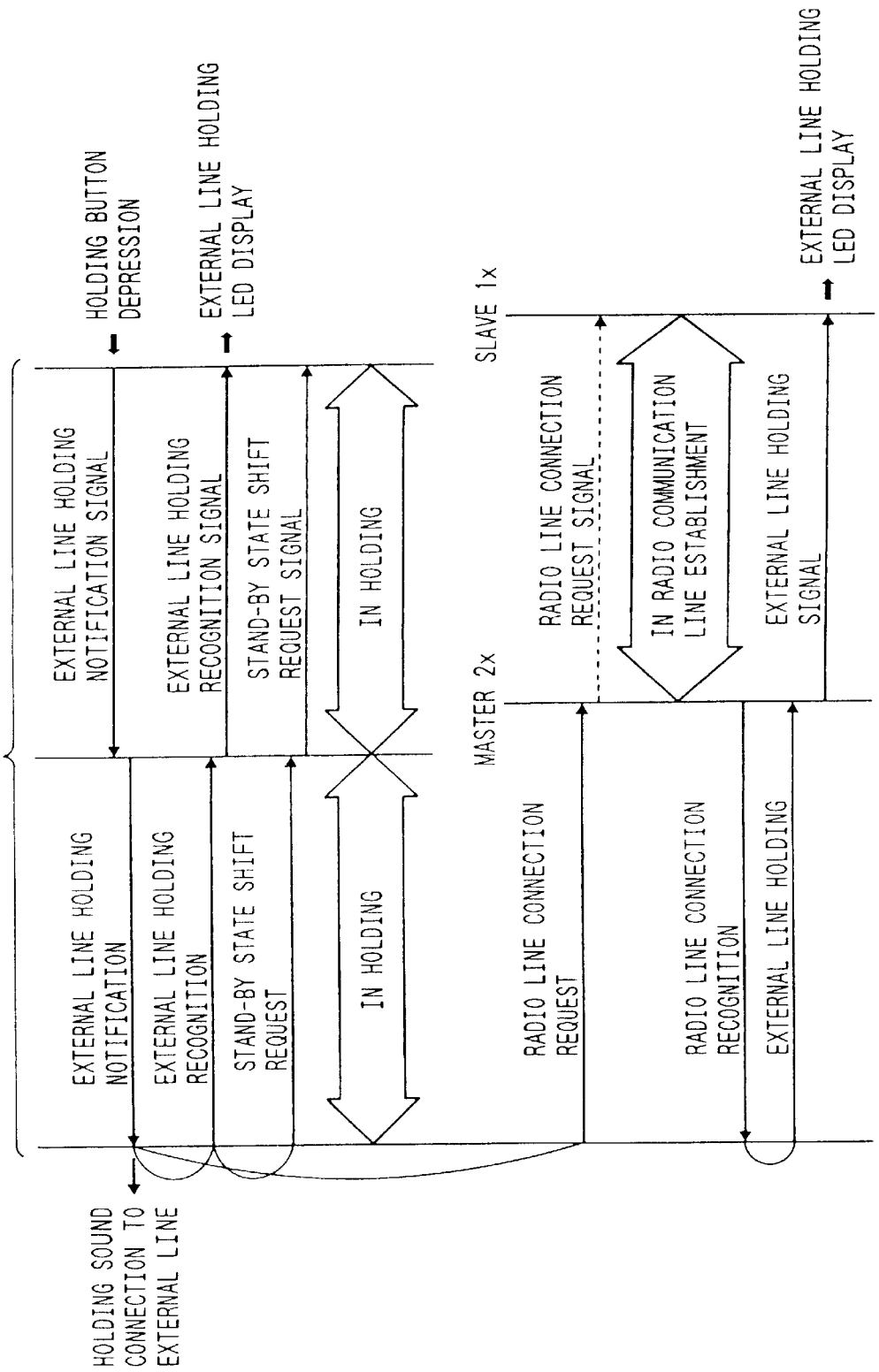
FIG. 2B which is composed of FIGS. 2B-1 and 2B-2 is a sequence chart of the first embodiment of the invention.
Figures 2, 2C:
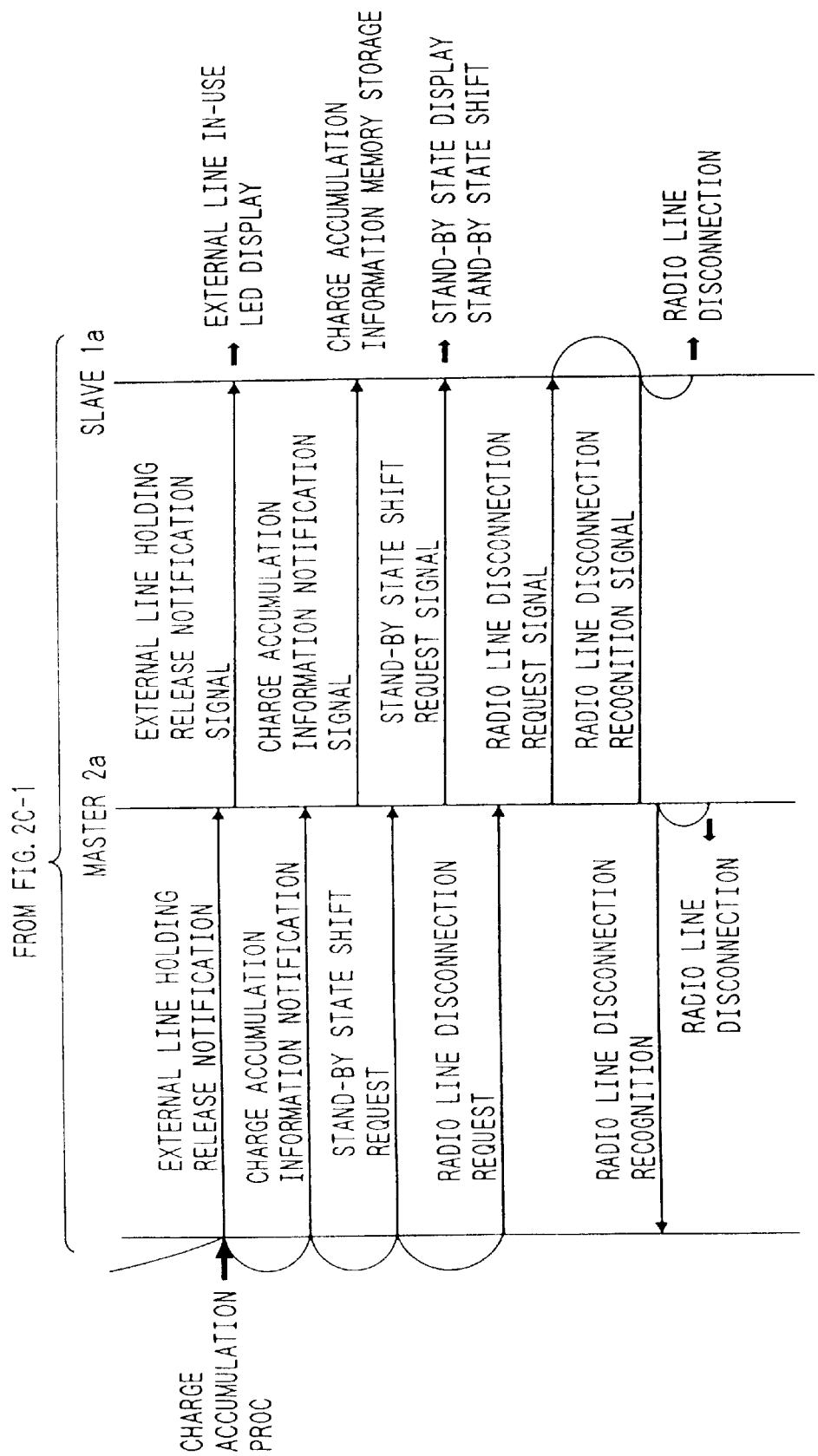
FIG. 2C which is composed of FIGS. 2C-1 and 2C-2 is a sequence chart of the first embodiment of the invention.
Figures 2, 3A:
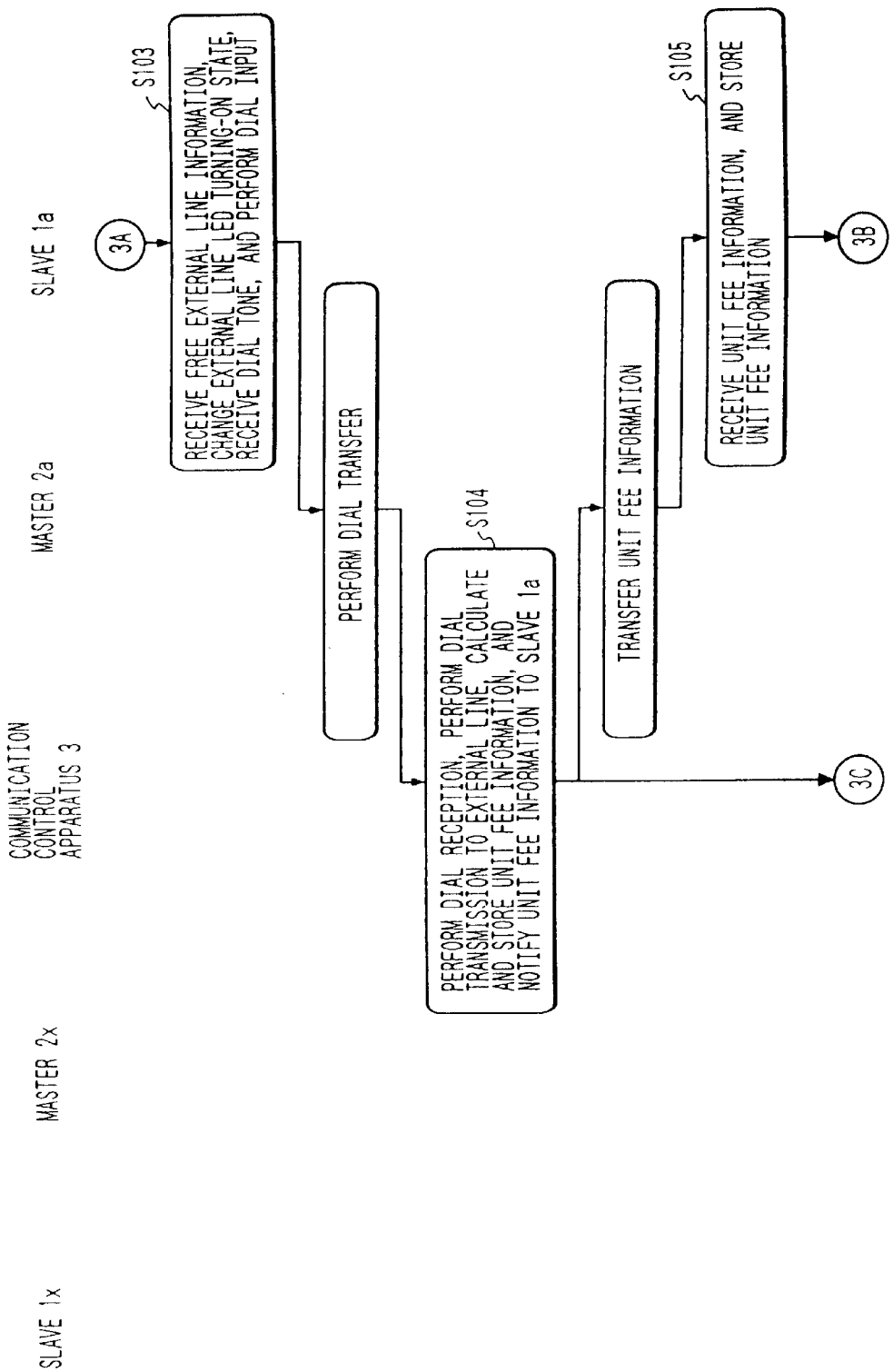
FIG. 3A which is composed of FIGS. 3A-1 and 3A-2 is a flowchart of the first embodiment of the invention.

In the case where the user of the slave 1x depresses the external line LED of the external line in-holding display and responds to the holding, the calculation control unit 310 of the communication control apparatus executes the charge accumulating process of the slave 1a and stores the charge accumulation information into the memory 320 in a manner similar to step S115 in FIG. 3C-2. In the embodiment, an information transmission/reception interface process 326 transmits the charge accumulation information 325 to the information processing apparatus 4 through the external interface 330. After that, in a manner similar to the first embodiment, the calculation control unit 310 transmits the external line holding release, charge accumulation information 325, and stand-by state shift request to the slave 1a via the master 2.

On the other hand, the calculation control unit 410 of the information processing apparatus 4 which received the charge accumulation information from the communication control apparatus 3 via the external interface 430 stores the charge accumulation information to the memory 420.

When the slave 1x is off-hooked, in a manner similar to step S120 in FIG. 3D-2, the calculation control unit 310 of the communication control apparatus 3 executes the charge accumulating process and stores the charge accumulation information to the memory 320. In the embodiment, the control unit 310 also transmits the renewed charge accumulation information 325 to the information processing apparatus 4 through the external interface 330.

The calculation control unit 410 of the information processing apparatus 4 which received the charge accumulation information from the communication control apparatus 3 via the external interface 430 stores the charge accumulation information to the memory 420.

When an accumulated fee total process activation command is inputted from a keyboard 440 of the information processing apparatus 4, the calculation control unit 410 of the information processing apparatus 4 reads out the charge accumulation fee information from the memory 420, executes a total process, and displays the total fee to a display 450.

By executing the third embodiment, the following peculiar effects are obtained.

Since the charge accumulation information 325 can be transmitted through the external interface to an apparatus (information processing apparatus 4 here) other than the communication control apparatus 3, the information can be uniquely processed in an external apparatus (for example, information processing apparatus 4) which received the charge accumulation information.

Figure 8B:
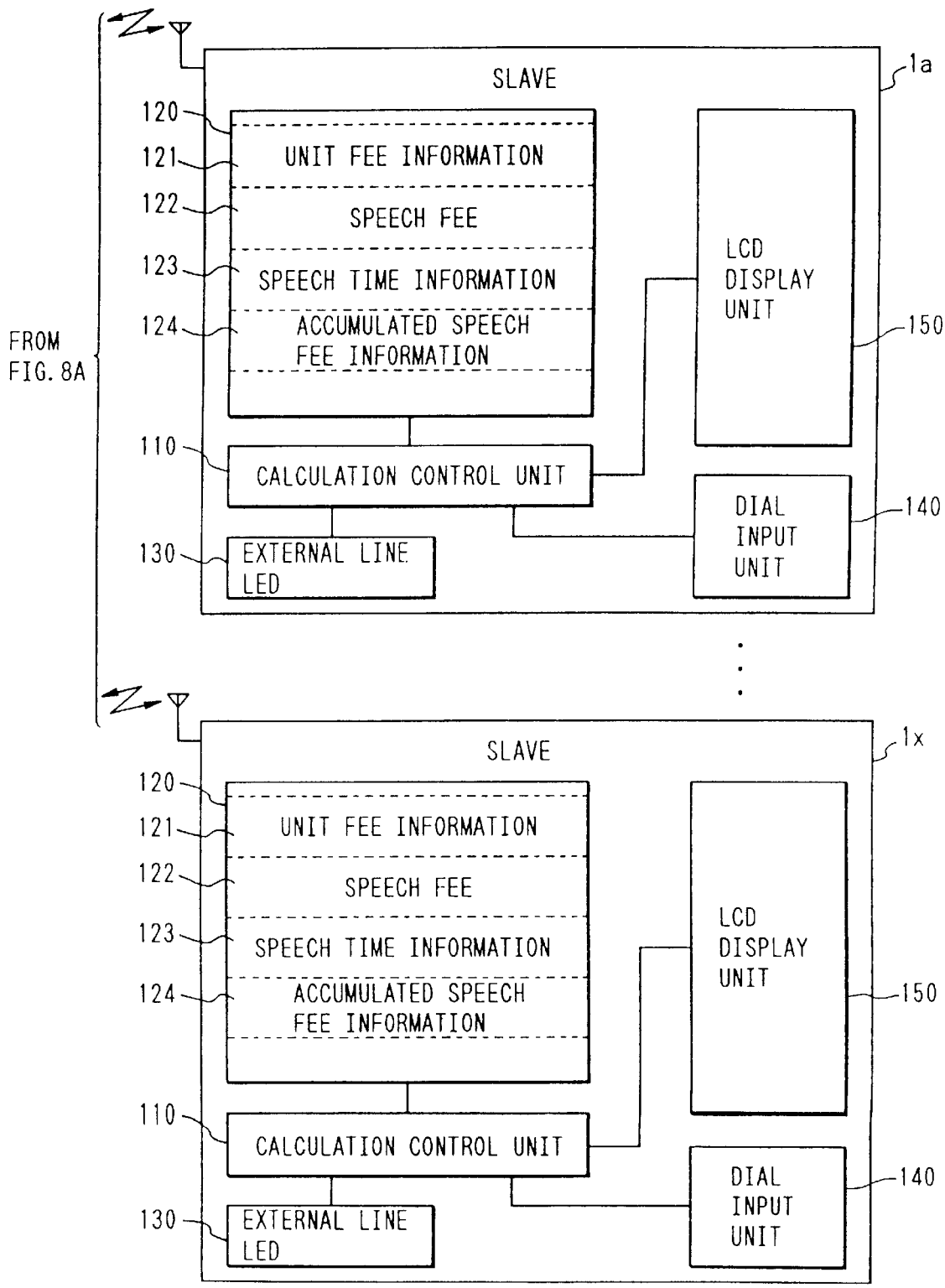
FIG. 8 which is composed of FIGS. 8A and 8B is a block diagram of the fourth embodiment of the invention.

FIGS. 8A and 8B are block diagrams showing a fourth radio telephone system embodying the invention.

As shown in the diagram, in the embodiment, the charge information in the memory 320 of the communication control apparatus 3 is replaced to speech fee information, the charge accumulation information is eliminated, and the charge accumulation information in the memory of the slave 1 is replaced to an accumulation speech fee. The other construction except the above points is common to that of the first embodiment (FIGS. 1A and 1B).

In the fourth embodiment, the accumulation of the speech fees is executed on the slave side.

In the case where the user of the slave 1x depresses the external line LED of the external line in-holding display and responds to the holding, the calculation control unit 310 of the communication control apparatus stops the speech fee process to the slave 1a, stores the speech fee to the memory 320, and newly starts the speech fee process to the slave 1x in a manner similar to step S115 in FIG. 3C-2. The control unit 310 transmits the external line holding release, speech fee information 324, and stand-by state shift request to the slave 1a via the master 2 and also transmits an external line holding release command to each of the other slaves 1 via the master 2. The control unit 310 transmits a radio line disconnection request to the slave 1a via the master 2a and to the other slaves 1 via the master 2.

The master 2a which received the external line holding release, speech fee information, and stand-by state shift request from the communication control apparatus 3 transfers them to the slave 1a. After that, the master 2a receives the radio line disconnection request from the communication control apparatus 3 and transfers the radio line disconnection request to the slave 1a. When a radio line disconnection recognition from the slave 1a is received, the master 2a disconnects the radio communication line with the slave 1a.

The calculation control unit 110 of the slave 1a which received the external line holding release, speech fee information, and stand-by state shift request from the master 2a sets the external line LED 130 to the in-use state display, calculates an accumulated speech fee on the basis of the speech fee information, stores to the memory 120, and displays the stand-by state to the LCD display unit 150 in a manner similar to step S118. After that, when the radio line disconnection request is received from the communication control apparatus 3 via the master 2a, the control unit 110 transmits a radio line disconnection recognition to the communication control apparatus 3 via the master 2a and disconnects the radio line.

When the slave 1x is on-hooked, the calculation control unit 310 of the communication control apparatus 3 stops the speech fee process and stores the speech fee information to the memory 320 in a manner similar to step S120. The control unit 310 disconnects the external line and transmits the external line state notification, speech fee information 324, and stand-by state shift request to the slave 1x via the master 2x and, after that, transmits the radio line disconnection request.

The master 2x which received the external line state notification, speech fee information, and stand-by state shift request from the communication control apparatus 3 transfers them to the slave 1x and, after that, transfers the radio line disconnection request from the communication control apparatus 3 to the slave 1x. The master 2x receives the radio line disconnection recognition from the slave 1x and transfers to the communication control apparatus 3 and, after that, disconnects the radio line.

The calculation control unit 110 of the slave 1x which received the external line state notification, speech fee information, and stand-by state shift request via the master 2x sets the external line LED to the free state display, calculates an accumulated speech fee on the basis of the speech fee information, and stores to the memory 120 in a manner similar to step S122. The control unit 110 displays the stand-by state to the LCD display unit 150 and shifts to the stand-by state. When the control unit 110 receives the radio line disconnection request from the communication control apparatus 3 via the master 2x, the control unit 110 transmits the radio line disconnection recognition to the communication control apparatus 3 via the master 2x and, after that, disconnects the radio line.

When the user of the slave 1a or 1x in the stand-by state depresses the display button of the accumulated speech fee, the calculation control unit 110 of the slave 1a or 1x reads out the accumulated speech fee information 124 stored in the memory 120 and displays to the LCD display unit.

By embodying the fourth embodiment, the following peculiar effects can be obtained.

Since the unit fee table 321 for speech fee calculation is provided in the memory in the communication control apparatus 3, such a table can be commonly used.

Since the accumulated speech fee is calculated by each of the slaves 1, the capacity of the memory in the communication control apparatus 3 and a load of the processes are reduced.

The present invention is not limited to each of the above embodiments but the following modifications are further possible.

For example, in FIGS. 1A and 1B, 4A and 4B, and 7A and 7B, in the embodiments, the unit fee table 321 to obtain the unit fee information which is used as a base of calculation of the speech fee has been stored in the memory 320 in the communication control apparatus 3 or the memory 120 in the slave 1. However, such a unit fee table can be also stored in the master 2 or information processing apparatus 4. An EL display unit, an electron beam display, or the like can be also used as an LCD display unit 150.

In the first embodiment, the slave 1a which generated a call has started the calculation of the speech fee after the elapse of a predetermined time after completion of the dial transmission in step S106 in FIG. 3B-1. However, the calculation of the speech fee can be also started after the polarity inversion was confirmed.

In a manner similar to step S104 in FIG. 3A-2, the calculation control unit 310 which received the final dial from the slave 1 via the master 2 transmits the final dial to the local line. After that, when a polarity inversion due to a response of the transmission destination side is detected, the calculation control unit 310 notifies response polarity inversion detection information to the slave 1a via the master 2a.

The calculation control unit 110 of the slave 1a which received a notification of the response polarity inversion detection information starts the counting operation of the speech elapsed time and the storage to the memory 120 in a manner similar to step S106 in FIG. 3B-1. The control unit 110 calculates the speech fee on the basis of the unit fee information 121 and speech time information 123 stored in the memory 120 in step S105 and starts the storage to the memory 120 and also starts the display of the speech fee 122 to the LCD display unit 150.

By embodying the fifth embodiment, the display of the more accurate speech fee can be started. The polarity inversion detection notification can be also used as a trigger to open a closed voice circuit so as to prevent that an unpleasant sound of a control signal is heard to the user.

The calculation of the speech fee can be also started by a voice detection in place of the polarity inversion. In the embodiment, a voice detecting unit is provided for the communication control apparatus 3. The other construction is common to the above first embodiment (FIGS. 1A and 1B).

The calculation control unit 310 which received the final dial from the slave 1 via the master 2 transmits the final dial to the local line in a manner similar to step S104 in FIG. 3A-2. After that, when the voice detecting unit detects a voice sound by a response on the transmission destination side, the calculation control unit 310 notifies the response voice detection to the slave 1a via the master 2a (S306).

The calculation control unit 110 of the slave 1a which received a notification of the response voice detection information starts the counting operation of the speech elapsed time and the storage to the memory 120 in a manner similar to step S106 in FIG. 3B-1. The control unit 110 calculates a speech fee on the basis of the unit fee information 121 and speech time information 123 stored in the memory 120 in step S105 and starts the storage to the memory 120 and also starts the display of the speech fee 122 to the LCD display unit 150.

In place of the polarity inversion, a voice detection can be also used in step S107 in the communication control apparatus 3.

By embodying the above sixth embodiment, even in the case where a polarity inversion as a response from the transmission destination side is not returned, the display of the more accurate speech fee can be started.

The further following modifications of the present invention are possible.

For example, although the unit fee table 321 to derive the unit fee information which is used as a base for calculation of the speech fee has been stored in the memory 320 in the communication control apparatus 3 in each of the above fifth and sixth embodiments, such a table can be also stored in the memory 120 in the radio slave or in the radio master. An EL display unit, an electron beam display, or the like can be also used as an LCD display unit 150.

Although the polarity inversion detection from the partner side has been used to activate the speech fee display in the fifth embodiment, a connection message reception notification by a connection message reception from the partner side can be also used in place of such a polarity inversion detection.

In the sixth embodiment, although the response voice detection notification obtained by detecting the response voice from the partner side by the voice detecting unit has been used to activate the speech fee display, such a detection means is not limited to the voice but it is also possible to use a data detection notification in the case where data in various kinds of data communications is detected by the voice detecting unit.

It is also possible to give a priority to each of the input of the final dial, after the elapse of a predetermined time after the transmission, the notification of the response polarity inversion detection of the partner side, and the notification of the response voice detection of the partner side and to combine them and to use such a combination of the priorities for the activation of the speech fee display.

In the above embodiments, although both of the speech fee and the accumulated fee which were charged for the speech in continuation have been displayed, only one of them can be also displayed.

Figure 9:
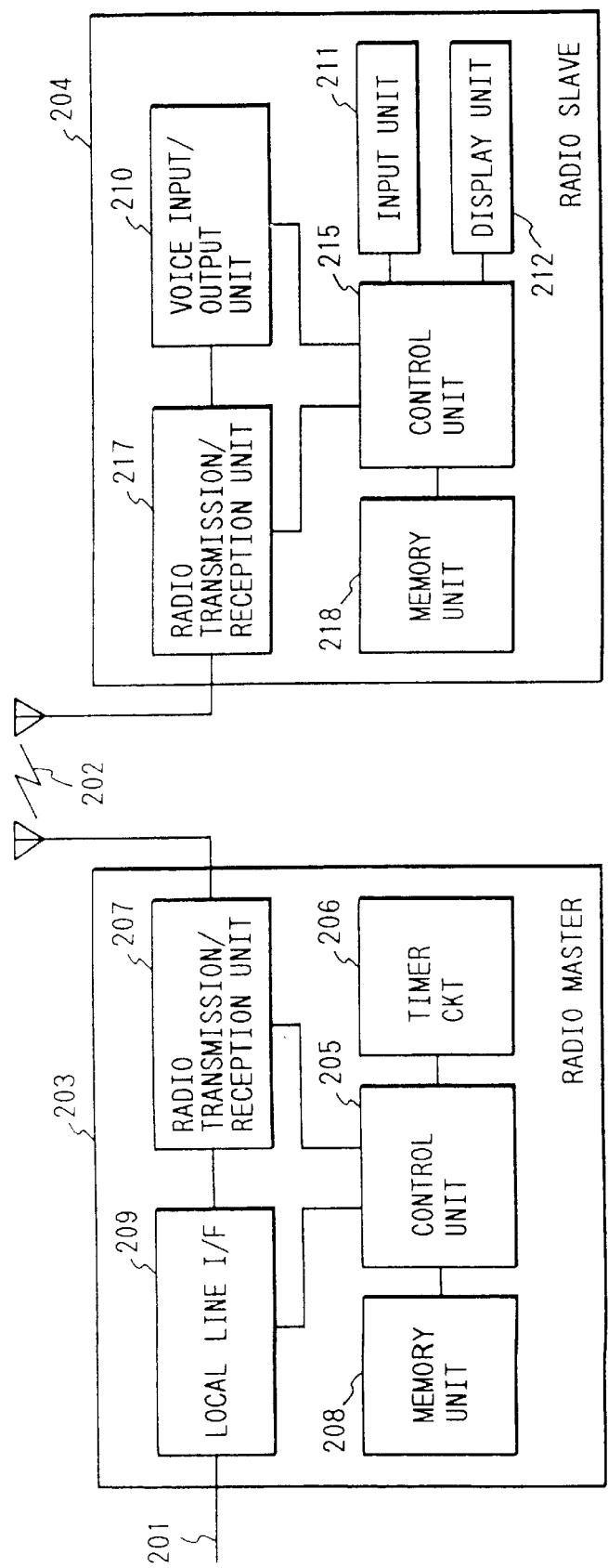
FIG. 9 is a block diagram of the seventh embodiment of the invention.

In case of displaying only the accumulated fee, such a construction can be also applied to a cordless telephone as shown in FIG. 9.

The cordless telephone is constructed by a radio master 203 and a radio slave 204. The radio master 203 comprises: a local line interface 209 to connect a local line; a radio transmission/reception unit 207 to transmit and receive data to/from the radio slave 204; a control unit 205 to control the radio master 203; a memory unit 208 to store various data; and a timer circuit 206 to count a time. Reference numeral 201 denotes a local line and 202 indicates a radio line.

The radio slave 204 comprises: a radio transmission/reception unit 217 to transmit and receive data to/from the radio master 203; a voice input/output unit 210 for a speech; an input unit 211 to input a dial or the like; a display unit 212 to display a speech fee or the like by an LCD or a voice; a control unit 215 to control the radio master 203; and a memory unit 218 to store various data.

Figure 10A:
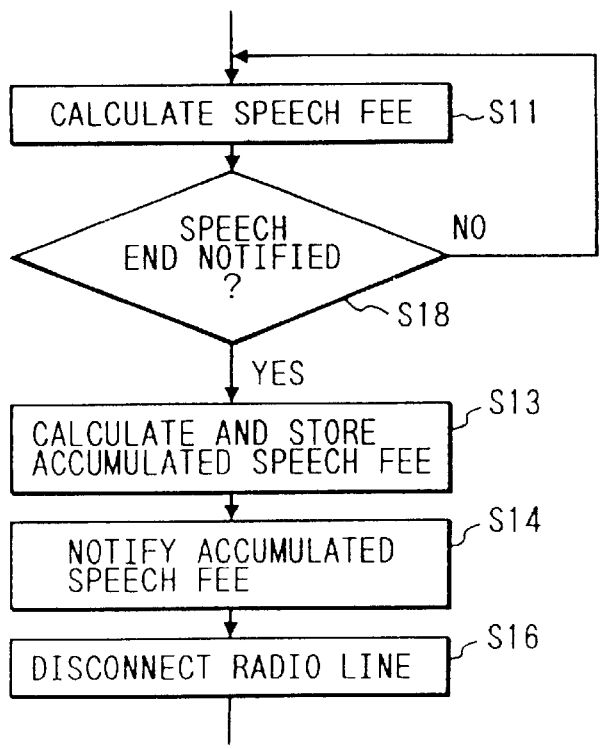
FIGS. 10A and 10B are flowcharts of the seventh embodiment of the invention.
Figure 10B:
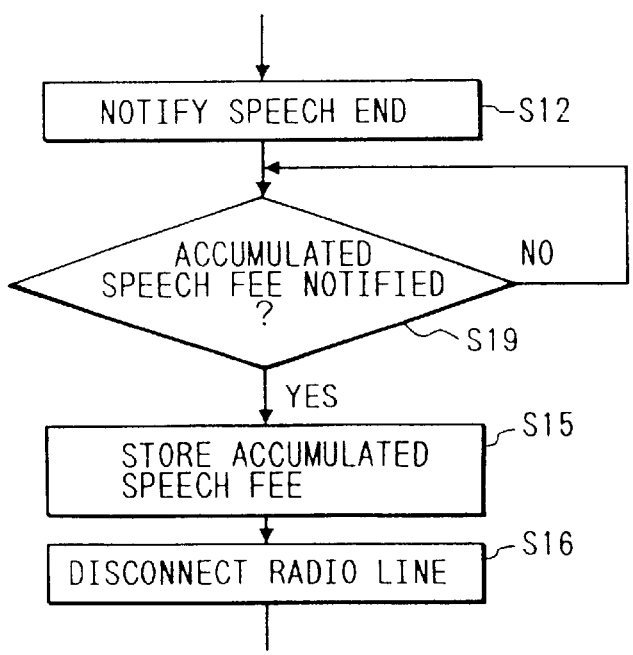
Figure 11:
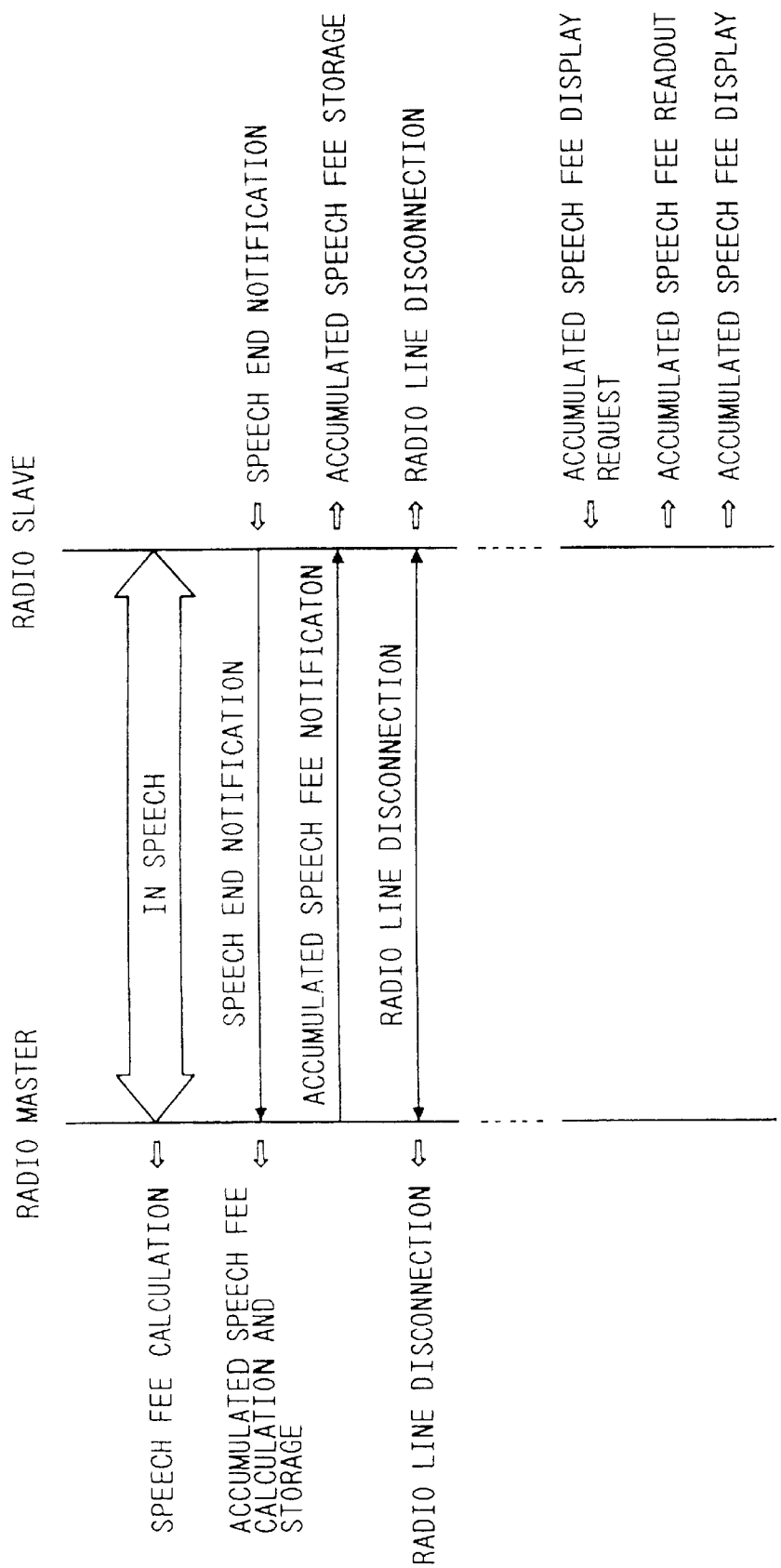
FIG. 11 is a sequence chart of the seventh embodiment of the invention.

FIGS. 10A and 10B are flowcharts showing the operation of the seventh embodiment and FIG. 11 is an explanatory diagram showing a communication sequence of the embodiment. a speech fee calculating process (S11), during the speech, the control unit 205 of the cordless telephone of the embodiment calculates a speech fee on the basis of a speech time of such a speech which is counted by the timer circuit 206 of the radio master 203 and unit fee information stored in the memory unit 208 of the radio master.

In a speech end notifying process (S12), when a judgment signal indicative of the end of speech is received from the input unit 211 of the radio slave, the control unit 215 of the radio slave 204 notifies the end of speech to the radio master 203 by the radio transmission/reception unit of the radio slave. There is an on-hook signal, a hook signal, or the like as such a judgment signal indicative of the speech end.

When a speech end notification is received in step S18, in an accumulated speech fee calculation storing process (S13), the control unit 205 adds the speech fee obtained by the speech fee calculating process to the accumulated speech fee information of the memory unit 208 of the radio master 203 and stores the resultant fee. In a speech fee notifying process (S14), the control unit 205 notifies accumulated speech fee information to the radio slave 204 by the radio transmission/reception unit 207. When the control unit 205 receives the accumulated speech fee information in step S19, the control unit 205 stores the accumulated speech fee information to the memory unit 218 of the radio slave 204 in an accumulated speech fee storing process (S15) and disconnects the radio line in step S16.

After that, when an accumulated speech fee display request is received from the user via the input unit 211, the control unit 215 of the radio slave 204 reads out the accumulated speech fee stored in the memory unit 218 of the radio slave and displays the accumulated speech fee to the display unit 212. As a display method, an LCD, a voice, or the like is considered.

As shown in FIG. 12, in the cordless telephone in FIG. 9, it is also possible to change the accumulated speech fee notification to the speech fee notification and to calculate and store the accumulated speech fee on the radio slave side. In such an eighth embodiment, since there is no need to store the accumulated speech fee on the master side, a memory area on the master side can be saved.

Although the present invention has been described above on the basis of the preferred embodiment, the invention is not limited to the foregoing embodiments but many modifications and variations are possible within the spirit and scope of the appended claims of the invention.

That is, the invention can be also applied to a system for communicating an image, a character code, or the like other than the telephone. the invention can be also applied to a communication system other than a radio system so long as the system communicates a control signal and a communication signal through a common channel.

What is claimed is:

1. A second communication apparatus comprising:

communicating means for communicating with a communication partner which has communicated with a first communication apparatus; and calculating means for calculating a cost of the communication with said communication partner in accordance with the communication between said communication partner and said first communication apparatus.

2. An apparatus according to claim 1, wherein said communicating means receives cost data for calculating the cost of the communication between said communication partner and said first communication apparatus.

3. A second communication apparatus comprising:

connecting means for connecting with a communication partner which has connected with a first communication apparatus; and calculating means for calculating a cost of the connection with said communication partner in accordance with the connection between said communication partner and said first communication apparatus.

4. An apparatus according to claim 3, wherein said connecting means receives cost data for calculating the cost of the communication between said communication partner and said first communication apparatus.

5. A communication method for a second communication apparatus, the method comprising the steps of:

communicating with a communication partner which has communicated with a first communication apparatus; and calculating a cost of the communication with said communication partner in accordance with the communication between said communication partner and said first communication apparatus.

6. A method according to claim 5, further comprising the step of receiving money data for calculating the cost of the communication between said communication partner and said first communication apparatus.

7. A communication method for a second communication apparatus, the method comprising the steps of:

connecting with a communication partner which has connected with a first communication apparatus; and calculating a cost of the connection with said communication partner in accordance with the connection between said communication partner and said first communication apparatus.

8. A method according to claim 7, further comprising the step of receiving money data for calculating the cost of the communication between said communication partner and said first communication apparatus.

9. A communication system comprising first and second communication apparatuses and a connecting apparatus for connecting a communication partner with said first and second communication apparatuses, wherein said second communication apparatus calculates a cost of communication with communication partner in accordance with communication between said first communication apparatus and the communication partner.

10. A system according to claim 9, wherein said connecting apparatus connects said second communication apparatus and the communication partner which has connected with said first communication apparatus.

11. A system according to claim 9, wherein said connecting apparatus transmits cost data for calculating the cost of the communication between said first communication apparatus and the communication partner.

12. A communication apparatus connected with a connecting apparatus, comprising:

managing means for managing cost of communication during communication; and corresponding means for making the cost correspond with the connecting apparatus.

13. An apparatus according to claim 12, wherein said corresponding means comprises receiving means for receiving cost data from the connecting apparatus.

14. A control method for controlling a communication apparatus connected with a connecting apparatus, comprising the steps of:

managing cost of communication during communication; and making the cost correspond with the connecting apparatus.

15. A method according to claim 14, wherein said corresponding step comprises a step of receiving cost data from the connecting apparatus.

16. A communication system comprising a communication apparatus and a connecting apparatus for connecting said communication apparatus with a communication partner, wherein said communication apparatus and said connecting apparatus independently manage cost relating to communication between said communication apparatus and the communication partner during the communication, and make the cost correspond with each other.

* * * * *

UNITED STATES PATENT AND TRADEMARK OFFICE
CERTIFICATE OF CORRECTION

PATENT NO.    : 6,424,705 B1
DATED         : July 23, 2002
INVENTOR(S)   : Toru Kikuchi et al.

It is certified that error appears in the above-identified patent and that said Letters Patent is hereby corrected as shown below:

Title page,
Item [63], Related U.S. Application Data,
"August 11, 2000," should read -- Jan. 22, 1998, --

Column 2,
Line 63, "a m main" should read -- a main --

Column 7,
Line 2, "fact-that" should read -- fact that --
Lines 4-5, "tone-from" should read -- tone from --

Column 8,
Line 24, "unit also" should read -- unit 310 also --

Figure 7B:
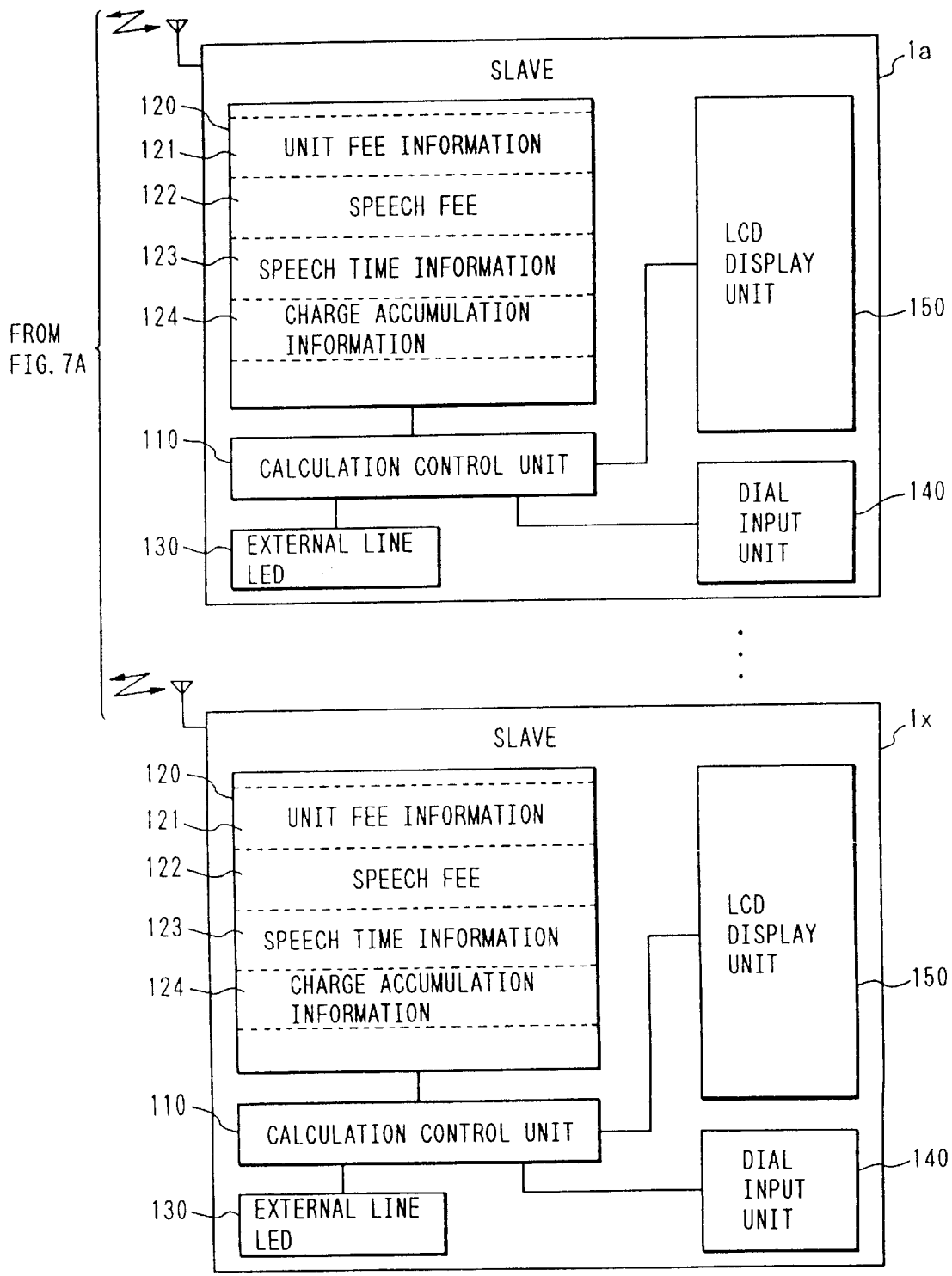
FIG. 7 which is composed of FIGS. 7A and 7B is a block diagram of the third embodiment of the invention.

Column 10,
Line 11, the following lines should be inserted which were omitted between "is" and "notification":

-- disconnected during the holding state due to an unexpected accident, since the charging process is shifted to the charge continuing process in the communication control apparatus 3, a non-execution of the charge calculation due to a radio accident doesn't occur.
  Figs. 7A and 7B are block diagrams showing a third radio telephone system embodying the invention.
  As shown in the diagram, in the third embodiment, an information processing apparatus 4 is connected to the communication control apparatus 3 through mutual external interfaces. The information processing apparatus 4 has: a calculation control unit 410 to control the information processing apparatus 4; a memory 420 in which charge accumulation information 421, charge accumulation total information 422 have been stored; and an external interface 430 to control a communication with the information processing apparatus 3. The communication control apparatus 3 has an external interfaced 330 to control a communication with the information processing apparatus 4. The other construction of the system of the third embodiment is common to that of the first embodiment (Figs. 1A and 1B) mentioned above. The third embodiment will now be described hereinbelow with respect to points different to the first embodiment.
  First, an information transmission/reception --

UNITED STATES PATENT AND TRADEMARK OFFICE
CERTIFICATE OF CORRECTION

PATENT NO. : 6,424,705 B1
DATED : July 23, 2002
INVENTOR(S) : Toru Kikuchi et al.

It is certified that error appears in the above-identified patent and that said Letters Patent is hereby corrected as shown below:

Column 14,
Line 34, "a speech fee" should read -- In a speech fee --

Column 15,
Line 15, "telephone. the invention" should read -- telephone. The invention --

Signed and Sealed this

Twenty-second Day of July, 2003

JAMES E. ROGAN
*Director of the United States Patent and Trademark Office*